United States Patent
Garbos et al.

(10) Patent No.: US 9,421,475 B2
(45) Date of Patent: Aug. 23, 2016

(54) CONTEXT-BASED INTERACTIVE PLUSH TOY

(71) Applicant: HALLMARK CARDS, INCORPORATED, Kansas City, MO (US)

(72) Inventors: Jennifer R. Garbos, Kansas City, MO (US); Timothy G. Bodendistel, Lenexa, KS (US); Peter B. Friedmann, Westwood, KS (US); Randy D. Smith, Lee's Summit, MO (US); William L. Brown, Jr., Kansas City, MO (US); Mary E. Gentry, Mission Hills, KS (US); Kevin W. Swanson, Prairie Village, KS (US); Robert E. Langley, Kansas City, MO (US)

(73) Assignee: HALLMARK CARDS INCORPORATED, Kansas City, MO (US)

( * ) Notice: Subject to any disclaimer, the term of this patent is extended or adjusted under 35 U.S.C. 154(b) by 597 days.

(21) Appl. No.: 13/650,420

(22) Filed: Oct. 12, 2012

(65) Prior Publication Data

US 2013/0072080 A1 Mar. 21, 2013

Related U.S. Application Data

(63) Continuation-in-part of application No. 13/116,927, filed on May 26, 2011, now Pat. No. 8,911,277, which is a continuation of application No. 12/625,977, filed on Nov. 25, 2009, now Pat. No. 8,568,189.

(51) Int. Cl.
*A63H 3/28* (2006.01)
*A63H 33/26* (2006.01)
(Continued)

(52) U.S. Cl.
CPC .................. *A63H 33/26* (2013.01); *A63H 3/28* (2013.01); *A63H 33/38* (2013.01); *G10L 15/00* (2013.01); *A63H 2200/00* (2013.01)

(58) Field of Classification Search
None
See application file for complete search history.

(56) References Cited

U.S. PATENT DOCUMENTS

| 4,799,171 | A |   | 1/1989 | Cummings et al. |
|---|---|---|---|---|
| 4,840,602 | A | * | 6/1989 | Rose .............................. 446/175 |

(Continued)

FOREIGN PATENT DOCUMENTS

| DE | 19617129 | 10/1997 |
|---|---|---|
| DE | 19617132 | 10/1997 |

OTHER PUBLICATIONS

Office Action dated Apr. 25, 2013, re U.S. Appl. No. 13/116,927, 26 pages.

(Continued)

*Primary Examiner* — Tramar Harper
(74) *Attorney, Agent, or Firm* — Shook, Hardy & Bacon L.L.P.

(57) ABSTRACT

An interactive toy for interacting with a user while a story is being read aloud from a book or played from a movie/video. The toy includes a speech recognition unit that receives and detects certain triggering phrases as they are read aloud or played from a companion literary work. The triggering phrase read aloud from the book or played in the movie/video may have independent significance or may only have significance when combined with other phrases read aloud from the book or played in the movie/video. In one embodiment, the toy is configured to detect only certain types of triggering prompts in certain states, such as, for example, triggering phrases or triggering terms. In this embodiment, and others, the toy is configured to switch between states such that it can at times respond to triggering terms and at other times respond to triggering phrases.

14 Claims, 19 Drawing Sheets

(51) Int. Cl.
  *G10L 15/00* (2013.01)
  *A63H 33/38* (2006.01)

(56) References Cited

U.S. PATENT DOCUMENTS

| | | | |
|---|---|---|---|
| 4,846,693 A * | 7/1989 | Baer | 434/308 |
| 4,923,428 A * | 5/1990 | Curran | 446/175 |
| 5,389,917 A | 2/1995 | LaManna et al. | |
| 5,655,945 A | 8/1997 | Jani et al. | |
| 5,657,380 A | 8/1997 | Mozer | |
| 5,790,754 A | 8/1998 | Mozer et al. | |
| 5,795,213 A | 8/1998 | Goodwin | |
| 5,930,757 A | 7/1999 | Freeman | |
| 6,021,387 A | 2/2000 | Mozer et al. | |
| 6,405,167 B1 * | 6/2002 | Cogliano | 704/251 |
| 6,665,639 B2 | 12/2003 | Mozer et al. | |
| 6,697,602 B1 | 2/2004 | Ferrigno et al. | |
| 6,773,344 B1 | 8/2004 | Gabai et al. | |
| 6,810,379 B1 | 10/2004 | Vermeulen et al. | |
| 6,832,194 B1 | 12/2004 | Mozer et al. | |
| 6,999,927 B2 | 2/2006 | Mozer et al. | |
| 7,062,073 B1 | 6/2006 | Tumey et al. | |
| 7,092,887 B2 | 8/2006 | Mozer et al. | |
| 7,248,170 B2 | 7/2007 | DeOme et al. | |
| 7,252,572 B2 | 8/2007 | Wright et al. | |
| 7,418,392 B1 | 8/2008 | Mozer et al. | |
| 7,487,089 B2 | 2/2009 | Mozer | |
| 7,720,683 B1 | 5/2010 | Vermeulen et al. | |
| 7,774,204 B2 | 8/2010 | Mozer et al. | |
| 7,801,729 B2 | 9/2010 | Mozer | |
| 7,940,168 B2 | 5/2011 | Needham et al. | |
| 8,070,628 B2 | 12/2011 | Denton et al. | |
| 2002/0028704 A1 | 3/2002 | Bloomfield et al. | |
| 2002/0107591 A1 | 8/2002 | Gabai et al. | |
| 2003/0162475 A1 * | 8/2003 | Pratte et al. | 446/175 |
| 2005/0105769 A1 | 5/2005 | Sloan | |
| 2005/0154594 A1 | 7/2005 | Beck | |
| 2006/0057545 A1 | 3/2006 | Mozer et al. | |
| 2006/0127866 A1 * | 6/2006 | Damron et al. | 434/236 |
| 2006/0234602 A1 | 10/2006 | Palmquist | |
| 2007/0093169 A1 | 4/2007 | Blaszczyk et al. | |
| 2007/0128979 A1 | 6/2007 | Shackelford et al. | |
| 2007/0132551 A1 | 6/2007 | Mozer et al. | |
| 2007/0298893 A1 | 12/2007 | Yu et al. | |
| 2008/0140413 A1 | 6/2008 | Millman et al. | |
| 2008/0152094 A1 | 6/2008 | Perlmutter | |
| 2008/0267364 A1 | 10/2008 | Janke et al. | |
| 2008/0275699 A1 | 11/2008 | Mozer | |
| 2008/0304360 A1 | 12/2008 | Mozer | |
| 2009/0094032 A1 | 4/2009 | Mozer | |
| 2009/0094033 A1 | 4/2009 | Mozer et al. | |
| 2009/0132255 A1 | 5/2009 | Lu | |
| 2009/0150160 A1 | 6/2009 | Mozer | |
| 2009/0204409 A1 | 8/2009 | Mozer et al. | |
| 2009/0204410 A1 | 8/2009 | Mozer et al. | |
| 2010/0028843 A1 * | 2/2010 | Currington et al. | 434/317 |
| 2011/0124264 A1 | 5/2011 | Garbos | |
| 2011/0223827 A1 | 9/2011 | Garbos et al. | |

OTHER PUBLICATIONS

Notice of Allowance dated Apr. 29, 2013, re U.S. Appl. No. 12/625,977, 17 pages.
UK Search Report dated Feb. 18, 2011 re Appln. GB1019162.5, 19 pages.
UK Search Report dated Oct. 26, 2011 re Appln. GB1114654.5, 6 pages.
Canadian Office Action dated Nov. 13, 2012 re Appln. 2686061, 3 pages.
Hasbro, Shrek 2 Talking Donkey, Talking Shrek, Talking Puss in Boots Instruction Manual, 2003.
Hasbro, Shrek 2 Wise-Crackin' Donkey Instruction Manual, 2003.
Office Action, dated Jan. 11, 2013 re U.S. Appl. No. 12/625,977, 31 pages.
Non-Final Office Action dated Jan. 31, 2014 re U.S. Appl. No. 13/116,927, 14 pages.
PCT Search Report and Written Opinion dated Mar. 10, 2014 re PCT/US2013/064847, 15 pages.
Final Office Action dated Oct. 9, 2013 re U.S. Appl. No. 13/116,927, 22 pages.
Non-Final Office Action dated Sep. 10, 2015 in U.S. Appl. No. 14/571,079, 15 pages.
Non-Final Office Action dated May 8, 2015 in U.S. Appl. No. 14/571,079, 14 pages.
Non-Final Office Action dated Jun. 19, 2015 in U.S. Appl. No. 13/933,665, 16 pages.
Canadian Examiner's Report dated Dec. 4, 2015 in Application No. 2,830,051, 3 pages.
Final Office Action dated Dec. 31, 2015 in U.S. Appl. No. 13/933,665, 11 pages.
Final Office Action dated Apr. 28, 2016 in U.S. Appl. No. 14/571,079, 25 pages.
Australian Office Action dated Apr. 7, 2016 in Application No. 2013328923, 3 pages.

* cited by examiner

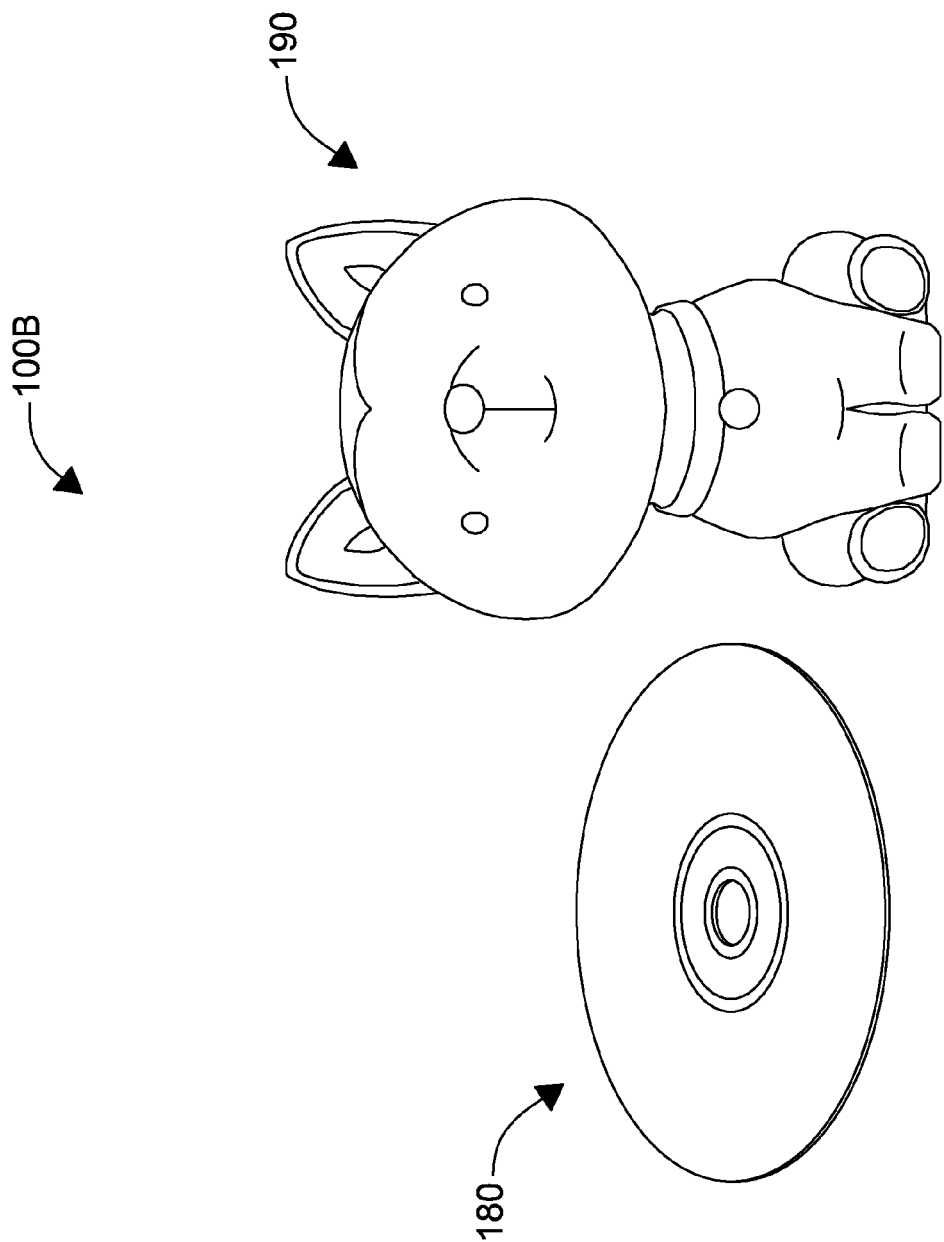

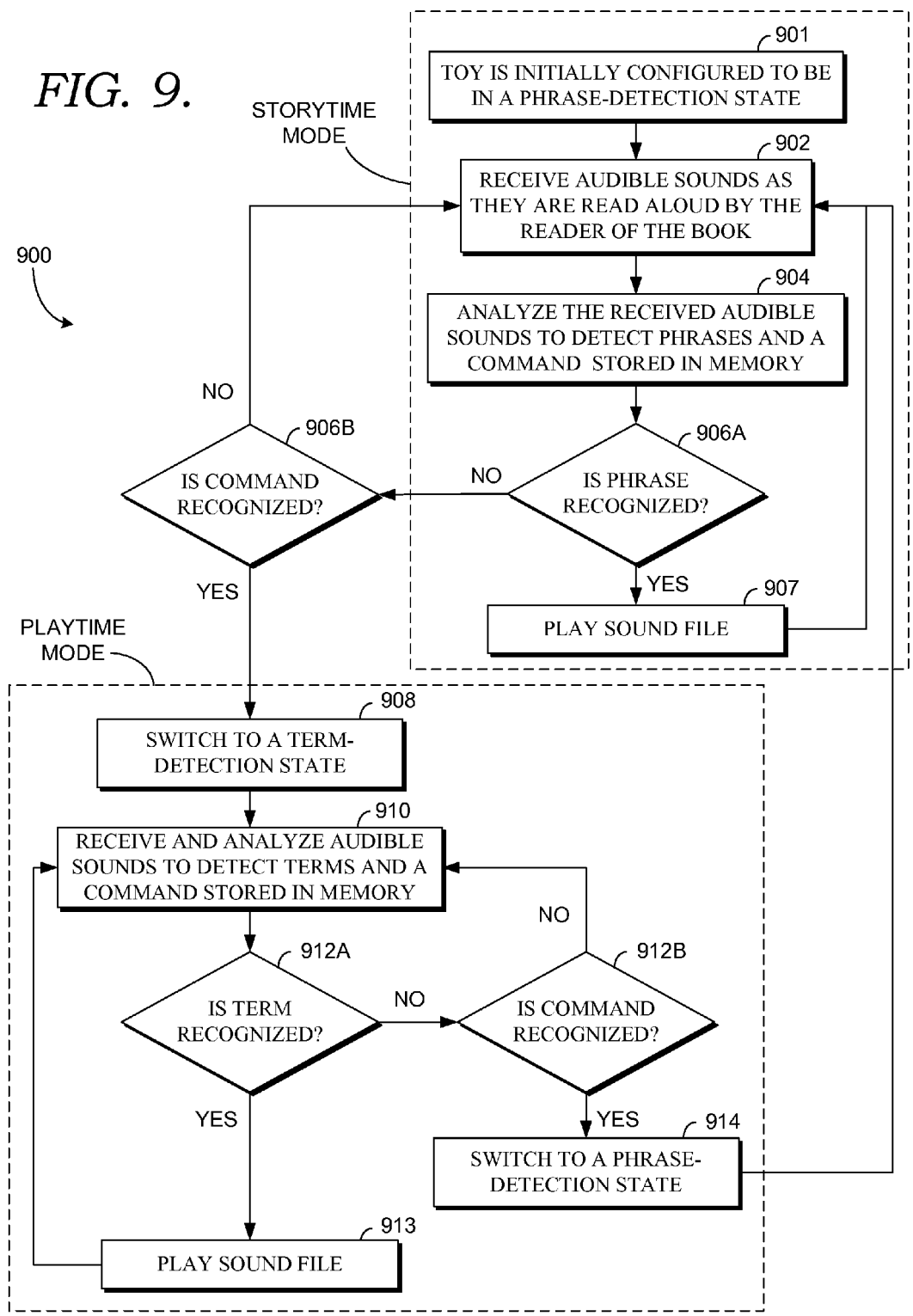

CONTEXT-BASED INTERACTIVE PLUSH TOY

CROSS-REFERENCE TO RELATED APPLICATIONS

This application is a continuation-in-part of U.S. application Ser. No. 13/116,927, filed May 26, 2011, which itself is a continuation of U.S. application Ser. No. 12/625,977, filed Nov. 25, 2009, both of which are hereby incorporated by reference in their entirety.

STATEMENT REGARDING FEDERALLY SPONSORED RESEARCH OR DEVELOPMENT

Not applicable.

BRIEF SUMMARY OF THE INVENTION

The present invention relates to an interactive toy. More particularly, this invention relates to a toy having electronic components therein to activate an interactive program in response to a context-based prompt or set of context-based prompts.

The toy includes a body having an interior cavity (or cavities) in which the electrical components are concealed. A user engagable activation switch is provided to initiate interaction with the toy. In one embodiment, the toy is programmed to receive and interpret spoken words and, depending on the analysis, provide a specific response.

In another embodiment, the spoken words are provided to the user as part of a literary work, such as, for example, a book. In this embodiment, the user reads the book aloud and the toy receives the spoken words and analyzes them. When a triggering phrase or set of phrases is detected, the toy activates a pre-programmed response. The triggering phrases of the current invention are included as part of the literary work and, in some embodiments, the user does not even known what phrases will trigger the response. In other embodiments, the triggering phrases are differentiated from surrounding text such that the user will know when a triggering phrase is about to be read aloud. In a different embodiment, the literary work may comprise a movie or television show. In this example, the toy is programmed to respond to certain triggering phrases that are broadcast as the movie/show is playing.

In still another embodiment of the present invention, phrases that trigger or correspond to a particular response are selectively placed within the literary work. For example, a triggering phrase could be placed at the beginning of a sentence or at the end of a page of the book. This selective placement facilitates reception and analysis of speech in a speech recognition unit positioned in the interactive toy.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWINGS

The features of the invention noted above are explained in more detail with reference to the embodiments illustrated in the attached drawing figures, in which like reference numerals denote like elements, in which FIGS. 1-5 illustrate one of several possible embodiments of the present invention, and in which:

FIG. 1B is a front perspective view of an interactive toy and movie system in accordance with one embodiment of the present invention;

FIG. 2 is a front perspective view of a book of FIG. 1A having certain triggering and non-triggering phrases in accordance with one embodiment of the present invention;

FIG. 9 is an excerpted flow diagram illustrating an exemplary method of activating alternate states or modes based on detection of prompts.

DETAILED DESCRIPTION OF THE INVENTION

Figure 1A:
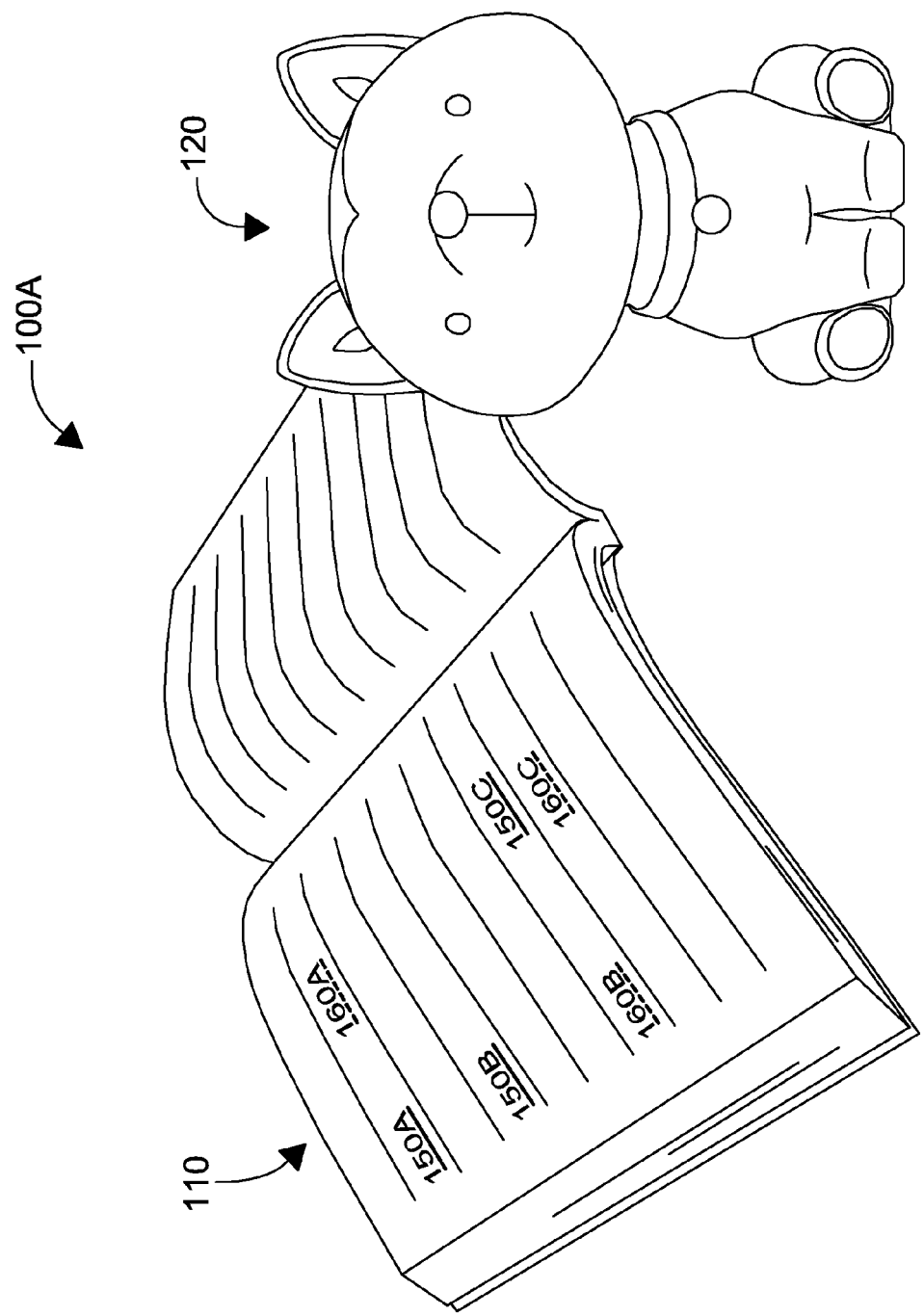
FIG. 1A is a front perspective view of an interactive toy and book system in accordance with one embodiment of the present invention.

Referring now to the drawings in more detail and initially to FIG. 1A, numeral 100A generally refers to a system in accordance with one embodiment of the present invention. In system 100A, numeral 110 designates a book, book 110 being distributed with an interactive plush toy 120 in accordance with an embodiment of the present invention. It is to be appreciated that book 110 could be any work of literature, such as, for example, a manuscript, a movie (e.g., on VHS, DVD, or any live media broadcast), a magazine (not shown), and so on. By way of further example, the work of literature in system 100A could include any live or live-action performance, such as, for example, live television programs, internet broadcasts, radio programming, and so on. Indeed, book 110 could be a greeting card with or without media functionalities. In one embodiment, book 110 does not include any special features or electronics, only carefully selected phrasing or words. That is, book 110 includes a number of phrases, some of which are triggering phrases 150, such as, triggering phrases 150a, 150b, 150c, and so on. As used herein, a "triggering phrase" can be any combination of words (or words occurring alone) that are programmed to elicit one or more responses in a device, such as, for example, interactive plush toy 120. The only requirement is that the phrase form a part of a narrative of a story being told. In addition to triggering phrases 150, book 110 includes other phrases, such as non-triggering phrases 160 (shown as non-triggering phrases 160a, 160b, and 160c). A "non-triggering phrase" is any combination of words (or words occurring alone) that is not a "triggering phrase." Like "triggering phrases," "non-triggering phrases" form a part of a narrative of a story being told. Thus, triggering phrases 150 and non-triggering phrases 160 combine to form a portion of a story being told, such as, for example, a portion of the story being told in book 110. When the story told in book 110 is read aloud by a user, the user incidentally reads both triggering phrases 150 and non-triggering phrases 160. Interactive plush toy 120, in accordance with one embodiment of the present invention, is configured to respond to triggering phrases 150 read aloud by the user. In certain embodiments, the responses activated by triggering phrases 150 are based, at least in part, by the location of triggering phrases 150 relative to other triggering phrases 150 in book 110 (e.g., response for triggering phrase 150b being based, at least in part, on previously detecting that a user read aloud triggering phrase 150a). Alternatively, the responses activated by triggering phrases 150 are based, at least in part, by the location of triggering phrases 150 relative to one or more of non-triggering phrases 160 in book 110 (e.g., response activated for triggering phrase 150c is optionally based, in part, on the sequence of triggering and non-triggering phrases illustrated in FIG. 1, including 160b, 150c, 160c). In still further embodiments, the response provided by interactive plush toy 120 coincides with the story told in book 110 and, as such, adds to or supplements the narrative included therein.

Referring now to FIG. 1B, numeral 100B generally refers to a system in accordance with one embodiment of the present invention. In system 100B, numeral 180 designates a movie, the movie 180 being distributed with an interactive plush toy 190 in accordance with an embodiment of the present invention. Alternatively, the plush toy 190 may be distributed separately, but designed to work with the movie 180. As is now clear, embodiments of the present invention encompass all types of literary works, including books and movies. As used herein, "literary works" include all works expressed in words or numbers, or other verbal or numeral symbols or indicia, regardless of the nature of the material objects, such as books, periodicals, manuscripts, phonorecords, film, tapes, and discs on which the literary works are embodied. "Literary works," thus, also includes all works that consist of a series of related images which are intrinsically intended to be shown by the use of machines or devices such as projectors, viewers, or electronic equipment (e.g., VCRs, computers, or DVD players) together with accompanying sounds, regardless of the nature of the material object, such as films, tapes, or memory devices, in which the literary work is embodied. For present purposes, however, "literary works" are limited in that they must describe a sequence of fictional or non fictional events. In this regard, "literary works" would not include, for example, "cue cards" and the like that fail to describe a sequence of fictional or non-fictional events.

Like book 110 discussed with regard to FIG. 1A, movie 180 includes carefully selected phrasing or words, that is, movie 180 includes a number of phrases, some of which are triggering phrases (not shown) and others that are non-triggering phrases (also not shown). Combined, the triggering phrases and the non-triggering phrases form at least a part of a story told in the movie, in that they join to describe a sequence of fictional or non-fictional events. While movie 180 is played, triggering phrases 150 and non-triggering phrases 160 are incidentally broadcast to interactive plush toy 190. Interactive plush toy 190, in accordance with one embodiment of the present invention, is configured to respond to the triggering phrases it receives while movie 180 is being played. In certain embodiments, the response activated by the triggering phrases are based, at least in part, by the location of the triggering phrases relative to other triggering phrases in movie 180 or by the location of the triggering phrases relative to one or more of non-triggering phrases in movie 180.

Figure 2:
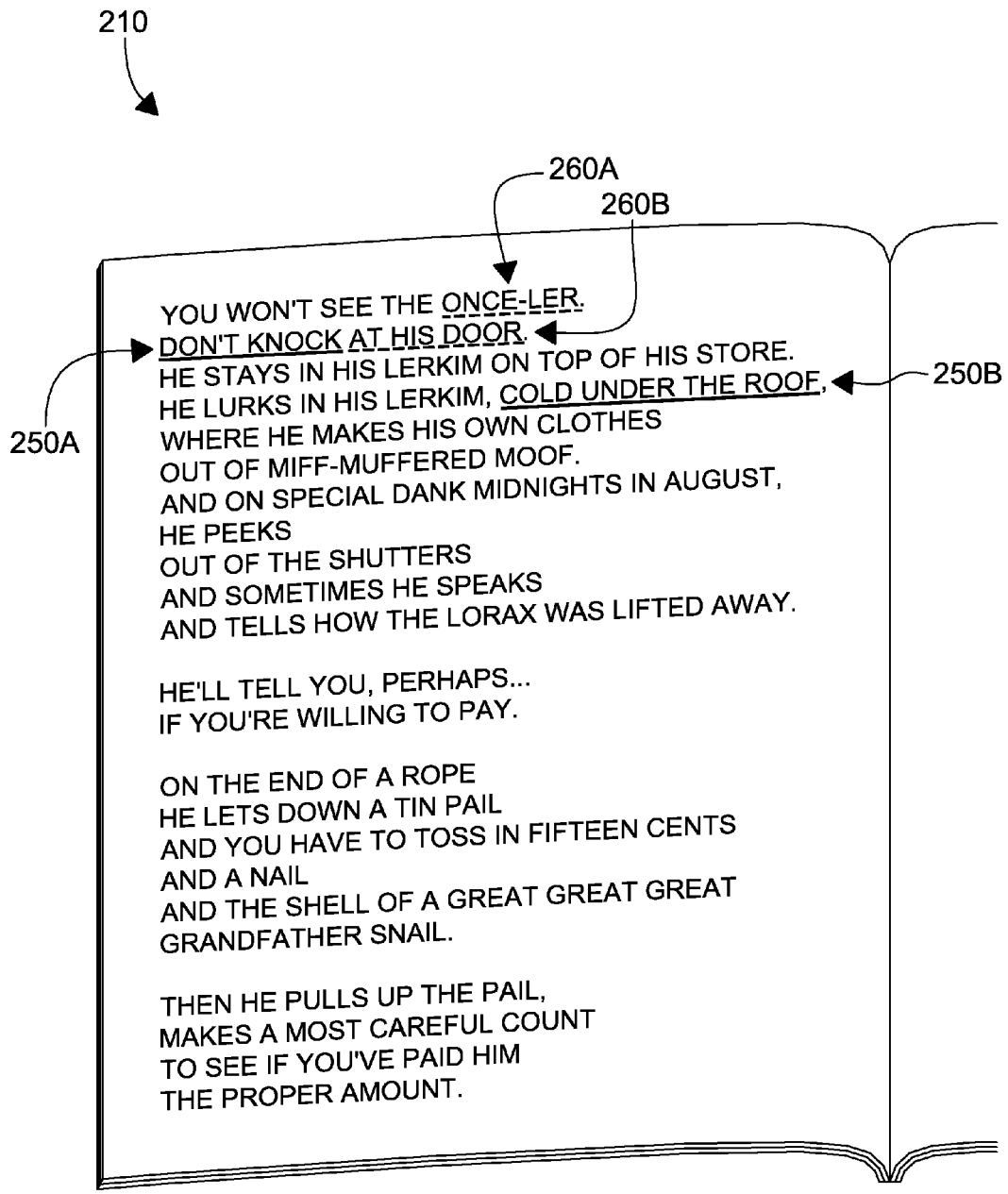

Turning now to FIG. 2, an exemplary configuration of book 110 is discussed. This exemplary configuration is denoted as book 210. As previously stated, book 210 includes a number of phrases, some of which are triggering phrases 250. The location of triggering phrases 250 are selectively positioned among other phrases, such as non-triggering phrases 260, such that they are more readily detectable by a speech recognition unit (not shown) in interactive plush toy 120 of system 100A (for clarity, the exemplary triggering phrases 250 of FIG. 2 are underlined with a solid line and the non-triggering phrases 260 are underlined with a dashed line). In accordance with one embodiment of the present invention, triggering phrase 250a may be selectively placed among a first non-triggering phrase 260a and a second non-triggering phrase 260b. In this example, the triggering phrase 250a ("don't knock") is placed after a first non-triggering phrase 260a ("once-ler"), at the beginning of a sentence, and before a second non-triggering phrase 260b ("at his door"). In other examples in accordance with alternate embodiments of the present invention, triggering phrases 250 may be embedded at the end of a sentence or within a clause of a sentence (such as a clause set off by commas). Moreover, one or more triggering phrases 250 could optionally be placed at the end of a page of a book (or, at the end of a sentence at an end of a page of the book). For instance, in FIG. 2, triggering phrase 250b ("cold under the roof") is a triggering phrase embedded within a clause of a sentence. The sentence describes a sequence of fictional or non-fictional events and forms at least a part of the narrative or story told in book 210. This selective placement ensures that, as the book is read, a natural breaking or pause point occurs before and/or after the user reads aloud one or more triggering phrases 250 of book 210.

Embodiments of the present invention also include selecting the words or phrases in a non-triggering phrase such that the non-triggering phrase is sufficiently contrasted from a triggering phrase. In this embodiment, non-triggering phrases with similar phonemes (i.e., elemental units of spoken language) as triggering phrases can be rewritten or removed to minimize the incidence of false positives (i.e., improper detections of triggering phrases). For example, a triggering phrase "Jingle even loved to sing" could be combined with two preceding non-triggering phrases "Jingle loved to say hello" and "Jingle loved to fetch." In this combination, the triggering and non-triggering phrases combine to read "Jingle loved to say hello. Jingle loved to fetch. Jingle even loved to sing." Because "loved to say hello" is similar, in at least one phoneme, to "loved to sing," this combination could increase the incidence of improper triggering phrase detections. As such, the entire combination could be selectively rewritten to read "Jingle loved to bark hello. Jingle loved to fetch. Jingle even loved to sing." Alternatively, it could be redrafted to read "Jingle loved to fetch. Jingle even loved to sing." In this embodiment, the phonemes of the triggering phrases and the non-triggering phrases are selected to contrast with one another.

Similar selective placement or drafting occurs when triggering phrases 250 and non-triggering phrases 260 are embedded in literary work of a different medium, such as, for example, a movie on a DVD. In this embodiment, the script of the movie (which corresponds to the text of the book) comprises both triggering (not shown) and non-triggering phrases (not shown). While the movie is played, the story of the movie is naturally advanced as time progresses. Incidental to this process, certain triggering phrases are uttered by the characters or other participants in the story being told (e.g., a narrator, and so on). These triggering phrases are optionally embedded within the script in accordance with the methodologies generally disclosed herein, such as, for example, those discussed above with regard to FIG. 2.

Figure 3A:
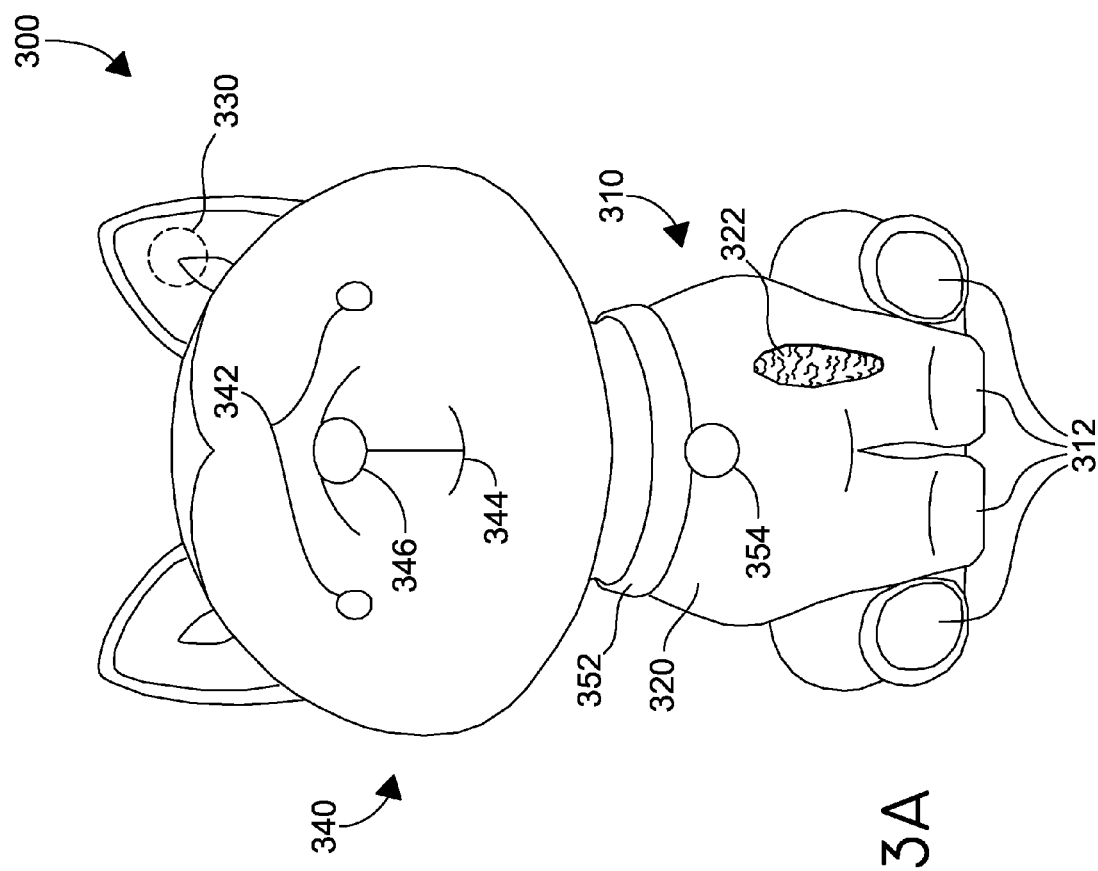
FIG. 3A is a front perspective view of the interactive plush toy of FIGS. 1A and 1B with some of the exterior features of the toy addressed.

Turning now to FIG. 3A, an exemplary construction of interactive plush toy 300 will now be provided. Interactive plush toy 300 can be of any material or construction, but in the illustrative embodiment disclosed herein, interactive plush toy 300 is a plush toy having a body 310 with a soft, furry exterior 320 and is filled with stuffing 322. In one embodiment, interactive plush toy 300 includes a user engagable switch 330. User engagable switch 330 is used for powering on the toy, such that, when user engagable switch 330 is engaged, interactive plush toy 300 is powered on. In the illustrated embodiment, user engagable switch 330 is located under the furry exterior 320, such as, for example, in the ear of interactive plush toy 300. In other embodiments, user engagable switch 330 can be located anywhere, such as, for example, on the furry exterior 320 or on the bottom of body 310. Interactive plush toy 300 includes a head 340, which may optionally include a pair of eyes 342, a mouth 344, and/or a nose 346. Body 310 of interactive plush toy 300 may also include a plurality of limbs 312. It should be understood that "limb" as used herein can mean leg or arm, but should also be understood in its broadest sense to mean any outwardly extending portion of interactive plush toy 300 (e.g., ears, tails, and the like). Interactive plush toy 300 may optionally include any number of other ornamental flourishes, such as, for example, a collar 352, a tag 354, a bell (not shown), and so on. In other embodiments, additional features may be optionally incorporated into interactive plush toy 300, such as, for example, lighting devices (not shown) or vibrating devices (also not shown). For instance, in some embodiments, head 340 may shake or nod or the bell (not show) may be configured to light up.

Figure 3B:
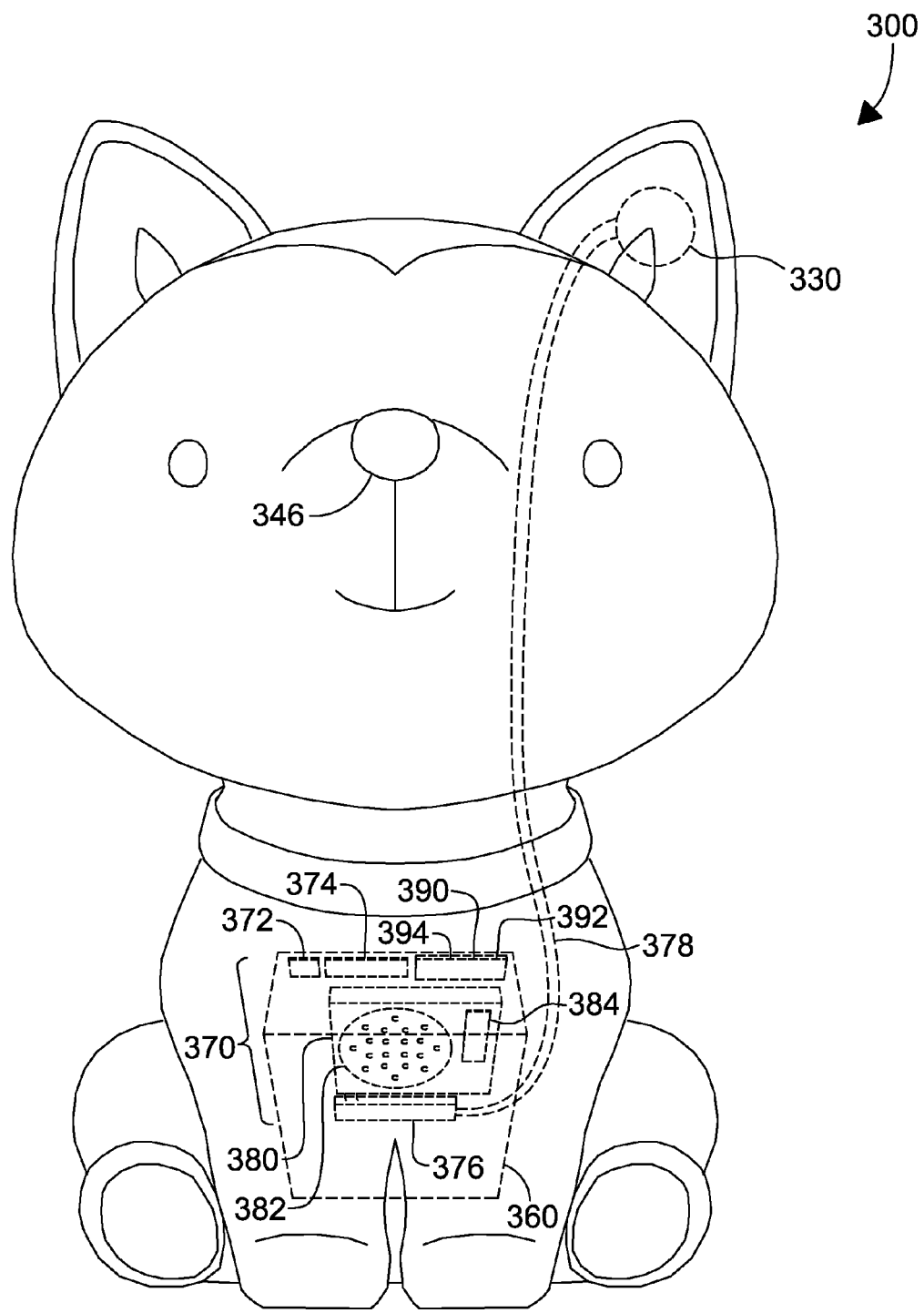
FIG. 3B is a front perspective view of the interactive plush toy of FIGS. 1A and 1B with some of the interior features of the toy addressed.

Referring now to FIG. 3B, interactive plush toy 300 may optionally include an interior cavity 360 housing a number of electrical components 370. Electrical components 370 are configured such that interactive plush toy 300 can play audible messages to interact with the user (not shown) of interactive plush toy 300. Exemplary electrical components 370 include, but are not limited to, a processor 372, a memory 374, a power supply 376, a sound module 380, and/or a speech recognition unit 390. In some implementations, any two or more of these electrical components 370, including sound module 380 and speech recognition unit 390, can be physically combined into a single device. In one potential implementation, sound module 380 and speech recognition unit 390 are combined into one device that performs the functionality of either or both of these components. Any number of other electrical components are contemplated, such that a full interactive effect may be realized by the user. Memory 374 could include any computer-readable media operable to store data or information and, thus, could comprise Random Access Memory ("RAM"); Read Only Memory ("ROM"); Electronically Erasable Programmable Read Only Memory ("EEPROM"); flash memory; and so on. In some embodiments, memory 374 is removable such that it can be replaced, updated, or changed by the user to accommodate new or updated literary works. In other embodiments, the new memory is distributed with a literary work, such as, for example, a new book or movie.

In the illustrative embodiment provided in FIG. 3B, power supply 376 includes one or more batteries (not shown) positioned in interior cavity 360 for powering one or more of electrical components 370. For example only, the one or more batteries (not shown) may be positioned in a battery compartment (not shown) that forms a part of a battery housing (not shown). Power supply 376 is electrically coupled to user engagable switch 330, such that, when user engagable switch 330 is engaged by the user (not shown), electrical power is delivered to one or more of electrical components 370. User engagable switch 330 and power supply 376 may be electrically coupled via one or more wires 378. In other embodiments, user engagable switch 330 optionally activates a "listening" mode (i.e., a standby mode). In this embodiment, user engagable switch does not fully control power supply 376. Rather, in this embodiment, one or more additional activation devices (e.g., switches, buttons, and so on; not shown) control the delivery of electrical power to one or more of electrical components 370, In this embodiment, the "listening" mode includes, for example, a current being delivered to one or more of electrical components 370 preparing for activation of user engagable switch 330.

In an embodiment, sound module 380 may be at least partially positioned within interior cavity 360 of body 310 and electrically coupled with power supply 376 by one or more wires 378. Sound module 380 preferably includes a speaker 382, a sound module controller 384, and various related circuitry (not shown). The related circuitry may work with the sound module controller 384 to activate speaker 382 and to play audio messages stored in sound module controller 384 or in memory 374 in a manner known to one of ordinary skill in the art. In one embodiment, processor 372 is used by sound module 380 and/or related circuitry to play the audio messages stored in sound module controller 384 and/or memory 374. In other embodiments, this functionality is performed solely by the related circuitry and sound module controller 384.

Speech recognition unit 390 may also be positioned within interior cavity 360 of body 310 and electrically coupled with power supply 376 by one or more wires 378. Speech recognition unit 390 preferably includes an input device 392, a speech recognition unit controller 394, and other related circuitry (not shown). An exemplary input unit 392 could include a microphone or other sound receiving device (i.e., any device that converts sound into an electrical signal). Speech recognition unit controller 394 may include, for example, an integrated circuit having a processor and a memory (not shown). Input device 392, speech recognition unit controller 394, and the other related circuitry, are configured to work together to receive and detect audible messages from a user or sound source (not shown). For example, speech recognition unit 390 may be configured to receive audible sounds from a user or other source and to analyze the received audible sounds to detect triggering phrases. Alternatively, speech recognition unit 390 may be configured to receive audible sounds from a user or other source and to analyze the received audible sounds to detect a sequence of triggering phrases and/or non triggering phrases. Based upon the detected triggering phrase (or each detected sequence of triggering phrases and/or non-triggering phrases), an appropriate interactive response may be selected. For example, for each detected triggering phrase (or the detected sequence of triggering phrases and/or non-triggering phrases), a corresponding response may be stored in a memory 374 or in speech recognition unit controller 394. Speech recognition unit 390 may employ at least one speech recognition algorithm that relies, at least in part, on laws of speech or other available data (e.g., heuristics) to identify and detect triggering phrases, whether spoken by an adult, child, movie, or so on. As would be appreciated by those of ordinary skill in the art, speech recognition unit 390 may be configured to receive incoming audible sounds (such as audible messages) and compare the incoming audible sounds to expected phonemes stored in speech recognition unit controller 394 or other memory device (such as, for example, memory 374). For example, speech recognition unit 390 may parse received speech into its constituent phonemes and compare these constituents against those constituent phonemes of one or more triggering phrases. When a sufficient number of phonemes match between the received audible sounds and the triggering phrase or phrases), a match is recorded. When there is a match, speech recognition unit 390, possibly by speech recognition unit controller 394 or the other related circuitry, activates the appropriate responsive program, such as, for example, the appropriate sound or action response.

Continuing with FIG. 3B, in one embodiment, nose 346 of interactive plush toy 300 is constructed of the same or similar material or construction as furry exterior 320. In another embodiment, however, nose 346 is made of a different material or construction, such as, for example, any suitable polymer (e.g., polypropylene, polyurethane, polycarbonate, polyethylene, and so on). In any embodiment, the nose 346 may be perforated, such that a portion of speech recognition unit 390 (or sound module 380) can be positioned behind the exterior of the nose 346. For example, input device 392 can be optionally positioned behind nose 346. In this implementation, speech recognition unit 390 is better able to receive and detect audible sounds because there is less interference from intervening objects, such as, for example, furry exterior 320 or stuffing 322. In another embodiment, speaker 382 of sound module 380 may be positioned behind the exterior of the nose 346. In another embodiment, both input device 392 and speaker 382 are positioned behind nose 346 or any other natural or designed aperture (or series or set of apertures). In still a different embodiment, one or more of these devices, such as input device 392, resides outside interactive plush toy 300 entirely, and is optionally incorporated into the companion literary work.

Interactive plush toy 300 may also include a number of other elements that are not illustrated in either FIG. 3A or 3B. Indeed, interactive plush toy 300 may include a number of light elements, such as for example, one or more light-emitting diodes ("LEDs") (not shown) or incandescent light bulbs (not shown). Likewise, interactive plush toy 300 may include one or more mechanical members (not shown) to be used in conjunction with an activated responsive program, such as, for example, mechanical members that facilitate a vibration or dancing program. Any number of other elements are optionally included, such that each embodiment of the present invention may be realized.

Figure 4A:
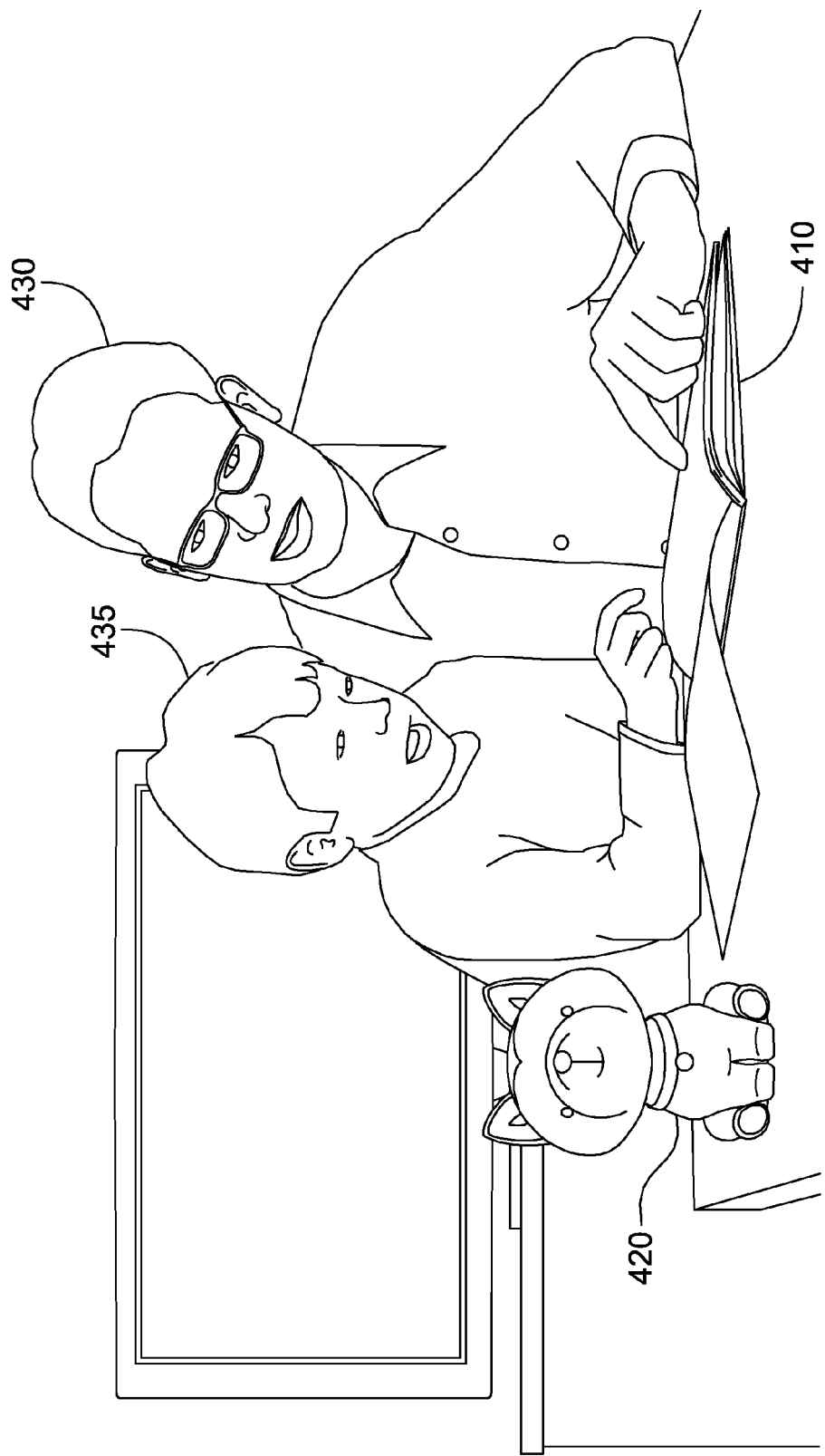
FIG. 4A is an illustration of one implementation of the present invention in which a father is reading a book to his child.
Figure 4B:
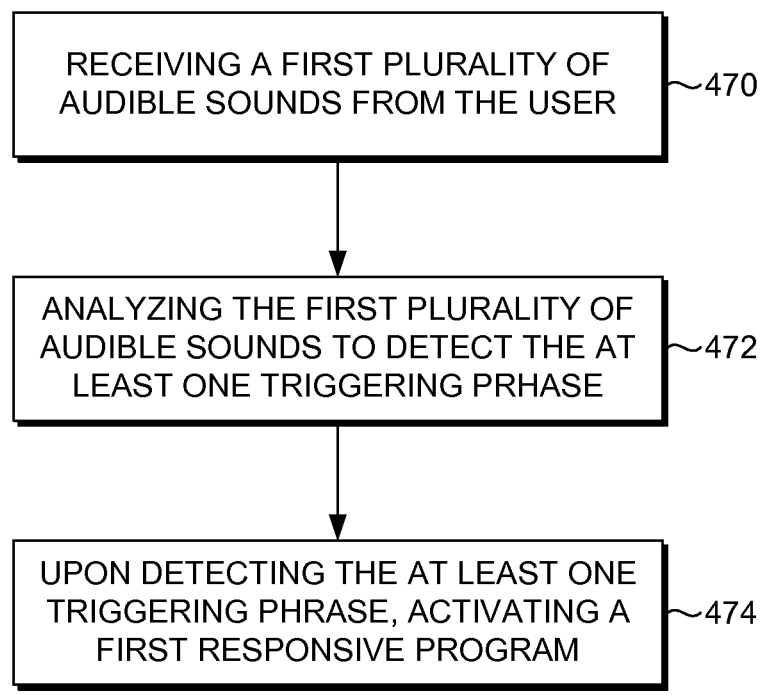
FIG. 4B is an excerpted flow diagram illustrating one exemplary method of interacting with a user.
Figure 4C:
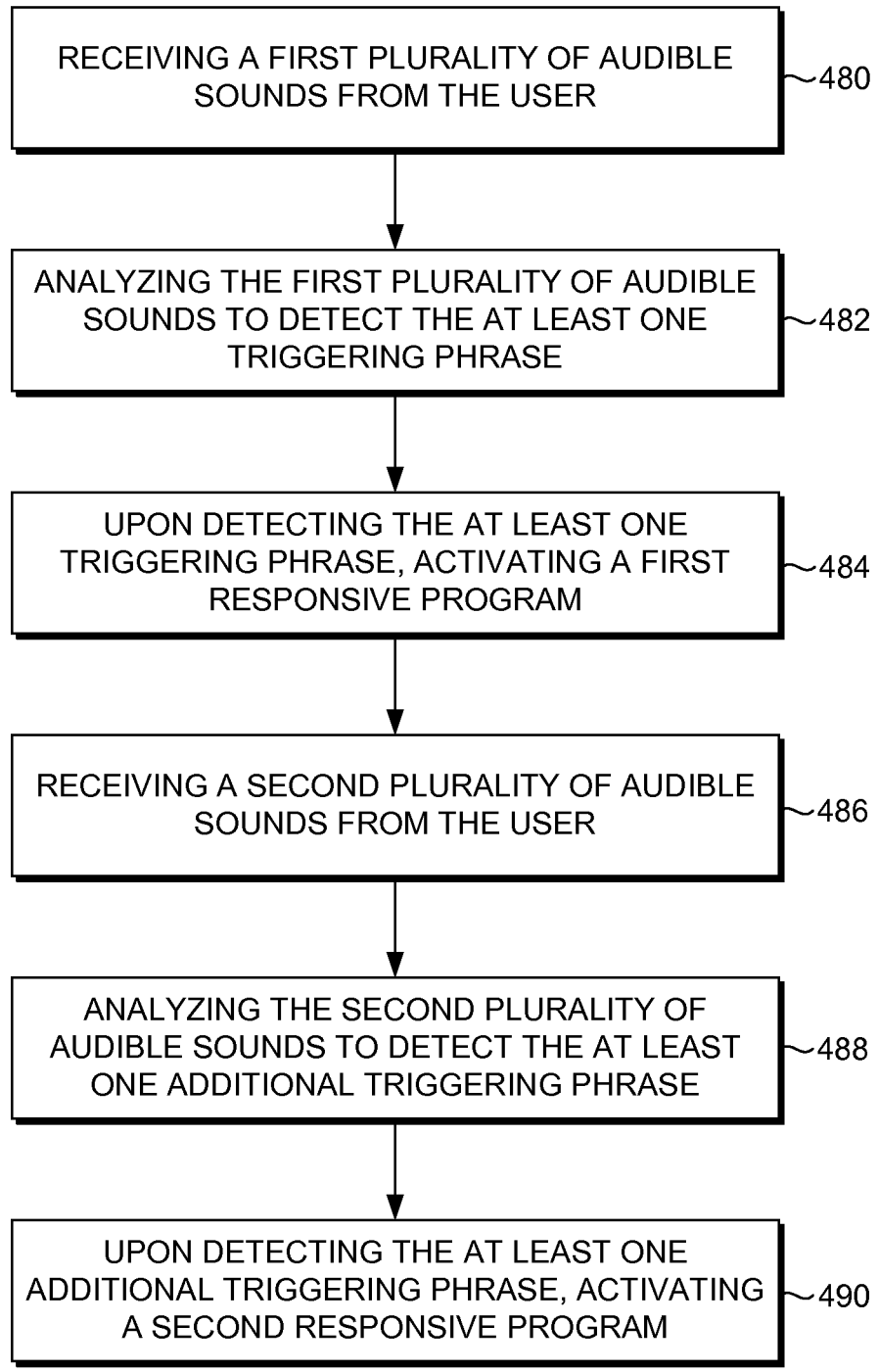
FIG. 4C is an excerpted flow diagram illustrating another exemplary method of interacting with a user.

Turning now to FIGS. 4A, 4B, and 4C, several exemplary embodiments of the present invention will now be addressed. As illustrated in FIG. 4A, a user 430 is reading a book 410 to a child 435 in accordance with one feature of the present invention. As previously explained with regard to FIG. 1, book 410 includes a number of phrases, some of which are triggering phrases (not shown) and some of which are non-triggering phrases (not shown). When combined, however, triggering phrases and the non-triggering phrases form part of the story told in book 410. Thus, when user 430 reads the story told in book 410, user 430 incidentally reads both triggering phrases and non-triggering phrases. In one embodiment, user 430 does not know which phrases are triggering phrases and which are not because triggering phrases are not identified as such in book 410. Alternatively, in a different embodiment, user 430 can identify which phrases are triggering phrases because, in this example, triggering phrases are marked or otherwise identified to the user (e.g., underlined, highlighted, shown in a different color, italicized, raised text, and so on). Thus, an implementation of the present invention becomes clear. User 430 reads from book 410 to child 435. Book 410 includes some story or narrative of interest to the child 435. As user 430 reads the story told in book 410, certain triggering phrases are incidentally read aloud. As user 430 reads the story told in book 410, and incidentally reads triggering phrases embedded therein, interactive plush toy 420 is configured to respond to triggering phrases as they are read aloud. This process is more fully described in FIG. 4B.

Turning to FIG. 4B, an exemplary method in accordance with one embodiment of the present invention is disclosed. At step 470, a toy, such as interactive plush toy 420, receives a first set of audible sounds from a user. The first set of audible sounds corresponds to the text of a book, such as book 410, as the book is read aloud by a user. In one embodiment, the audible sounds include the voice of the user as the user reads the book aloud. In other embodiments, however, the audible sounds may be received from any source, such as, for example, a child. In the latter embodiment, the book, such as book 410, may instruct the user or the child to read or recite certain phrases in the book, such as, for example, certain triggering or non-triggering phrases. The audible sounds received by the toy, such as interactive plush toy 420, correspond to text read aloud from the book that contains any number of triggering phrases and any number of non-triggering phrases. When read together, the triggering and non-triggering phrases form a narrative in the book, such as book 410, that describes a sequence of fictional or non-fictional events. For example, the triggering and non-triggering phrases can combine to tell the story of a little dog that behaves very well.

Thereafter, at step 472, the toy analyzes the first set of audible sounds. The first set of audible sounds is analyzed to detect a first phrase, such as, for example, a triggering phrase. This triggering phrase can be any phrase that forms a part of the story told in the book. The toy, such as interactive plush toy 420, then detects whether the received audible sounds correspond to at least one of the triggering phrases embedded in the book. The toy, such as interactive plush toy 420, compares the audible sounds to a list of triggering phrases stored in a controller (such as speech recognition unit controller 394 discussed in FIG. 3B) or a memory (such as memory 374 discussed in FIG. 3B). In one embodiment, the speech recognition unit receives audible sounds and divides them into phonemes. In this embodiment, the phonemes of the received audible sounds are compared against the phonemes of the programmed triggering phrases to detect a match. When a match is made, a controller device (such as speech recognition unit controller 394, discussed above at FIG. 3B) determines which responsive program should be activated and activates that responsive program. In this implementation, because phonemes are compared, the speech recognition unit does not discriminate on the bases of pitch and/or tempo. In this regard, embodiments of the present invention are suited for any sound source, such as, for example, an adult's voice, a child's voice, or even a character in a movie. It should be noted, however, that other speech recognition technologies are contemplated within the scope of the present invention, such as, for example, sound frequency and/or amplitude-based speech recognition algorithms.

When a triggering phrase is detected, at step 474, the toy, such as interactive plush toy 420, activates a responsive program. The responsive program can take many forms, such as, for example, an audio file, a mechanical program (e.g., a dancing program, a vibration program, and so on), a lighting program, and the like. In one embodiment, the potential responsive programs supplement or augment the narrative or story being told in the literary work. For example, the triggering phrase read aloud from the book may include a reference to a "dog barking real loud." Upon detection of this phrase, the method discussed in FIG. 4B activates a pre-programmed responsive program, such as, for example, an audio file of a dog barking. For further illustration, the triggering phrase read aloud from the book may include a reference to a dog that "is really, really cold." When this potential triggering phrase is detected by a toy dog, such as interactive plush toy 420, the toy dog can activate a movement program, wherein all or part of the toy dog moves. For example, the movement program may include a vibration sequence, in which all or part of the dog vibrates. The vibration sequence supplements or augments the story because it appears to user 430 that the toy is shivering because it "is really, really cold."

In another embodiment, the responsive program may comprise data or information. The data or information responsive program may be activated alone or in combination with any other responsive program, such as, for example, an audio file or a movement program. The data or information may optionally be displayed to the user or communicated to another device or set of devices. Communication of information or data may be through any standard communication method or means, including, for example only, wired or wireless. Wired configurations optionally include serial wiring, firewire, USB, and so on. Wireless configurations optionally include any radio frequency communication technique, Wi-Fi, bluetooth, and so on. In these exemplary implementations, the data or information may optionally be used by the receiving device or devices in a manner consistent with embodiments of the inventions, such as, for example, to supplement the story being told, to activate a responsive program, and so on.

Likewise, the triggering phrase read aloud from the book could mention the "bright red nose of the reindeer." Upon detecting this phrase, for example, a light program could be activated in which the nose of the toy (in this case, a toy reindeer) lights up (e.g., turns red). The light program supplements or augments the narrative of the story because the lighting program occurs substantially simultaneously as the text is read aloud, appearing, to the user, to occur in response to the reading of the whole story. Other potential responsive programs, such as moving limbs and so on, are contemplated within the scope of the present invention. The prior recitation of examples should in no way be construed as limiting. For example, a number of responsive programs could, optionally, be activated in response to a single triggering phrase.

The process described in FIG. 4B may optionally be expanded to include additional iterations. One such iteration is explained in FIG. 4C. As shown in FIG. 4C, the process begins much as the process illustrated in FIG. 4B. Namely, at step 480 the step described in FIG. 4B (step 470) is performed. That is, a toy, such as interactive plush toy 420, receives a first set of audible sounds from a user. Thereafter, at step 482 of FIG. 4C, the toy analyzes the first set of audible sounds to detect a first phrase, such as, for example, a triggering phrase. When a first triggering phrase is detected, at step 484, the toy, such as interactive plush toy 420, activates a responsive program. All of these steps were explained above, with regard to FIG. 4B.

Continuing on, at step 486, the toy, such as interactive plush toy 420, receives a second set of audible sounds from the user. The second set of audible sounds may also correspond to the text of a book, such as book 410, as the book is read aloud by a user. Much like the embodiments discussed above, the second set of audible sounds may include the voice of the user or may be received from any source, such as, for example, a child. When read together, the triggering and non-triggering phrases form a narrative in the book, such as book 410, that describes a sequence of fictional or non-fictional events. Because the user has continued to read the book, the second set of audible sounds contains triggering and non-triggering phrases that combine to continue the narrative in the book formed by the first set of triggering and non-triggering phrases. For example only, the second set of audible sounds may expand on the story of the well-behaved dog discussed above.

Much like step 474 addressed above, at step 488, the toy analyzes the second set of audible sounds to detect a second phrase, such as, for example, a second triggering phrase. In certain embodiments, the first triggering phrase and the second triggering phrases are different, but that it not required. On the contrary, the triggering phrases may be the same and may be differentiated with reference to non-triggering phrases and/or other triggering phrases For example, a triggering phrase could be the phrase "Jingle is a good dog." In the first occurrence of this triggering phrase, the phrase could be embedded at the beginning of a sentence and followed by the non-triggering phrase "Or so we thought." In this example, the combination of the triggering phrase and the non-triggering phrase would be "Jingle is a good dog. Or so we thought." In this implementation, the triggering phrase "Jingle is a good dog" may correspond to a responsive program programmed in an interactive plush toy dog, such as, for example, an audio file of a dog whimpering or a mechanical response in which the toy dog cowers (lowers its head). In contrast, the same triggering phrase could be combined with a non-triggering phrase "Jingle ran right inside. Indeed," to form "Jingle ran right inside. Indeed, Jingle is a good dog." Here, the corresponding responsive program may include activating an audio file of a dog barking happily or a mechanical response in which the toy dog wags its tail. In this regard, embodiments of the present invention contemplate not only detecting whether the received audible sounds correspond to at least one of the triggering phrases embedded in the book, but also applying context-based rules to detect a triggering phrase and activate the appropriate response. These rules can be stored in a memory (such as memory 374, discussed with regard to FIG. 3B) or a controller (such as, for example, speech recognition unit controller 394 discussed above). In other embodiments, context-based rules may include, for example, the previously received triggering or non-triggering phrases or the previously activated responsive programs. That is, the response activated upon the detection of a second triggering phrase can be based, at least in part, on the response activated upon detect of a first triggering phrase or, for that matter, the actual occurrence of the first triggering phrase.

Upon detecting the second triggering phrase, at step 490, the toy then activates a second responsive program. The second responsive program further supplements or augments the narrative in the book. In one embodiment, the second responsive program is of a different kind than the first responsive program, such as, for example, an audio file versus a vibration program. In other embodiments, however, the responsive programs are optionally of the same kind (e.g., both audio files). In still other embodiments, the first triggering phrase and the second triggering phrase each correspond to a number of potential responsive programs. For instance, a particular triggering phrase may correspond with three potential responsive programs. The second triggering phrase may also correspond with three potential responsive programs. In this embodiment, however, both the first triggering phrase and the second triggering phrase only correspond to one shared or common responsive program. Thus, when this sequence of triggering phrases is received and detected by a device, only one responsive program satisfies both triggering phrases. In this example, the shared or common responsive program is then activated in accordance with the procedures previously discussed.

The process described above can be repeated as many times as necessary, such as, for example, a third or a fourth time. Each time, the supplemental audible sounds correspond with text from the book and the supplemental triggering and non-triggering phrases combine to continue the narrative told in the book. As this process repeats, certain determination or detections may need to be stored (such as, for example, in sound module controller 384 or memory 374 discussed in FIG. 3B). When subsequent detections are made, these store results may be activated or called by the processor (such as processor 372 discussed in FIG. 3B) or a controller (such as sound module controller 384 or speech recognition unit controller 394 discussed in FIG. 3B). Thus, the embodiments of the present invention include applying previously-detected or received triggering phrases and/or non-triggering phrases to determine the appropriate response to any subsequently-occurring response, as previously described. Moreover, each triggering phrase can correspond with a number of potentially responsive programs and, as additional triggering phrases are received and detected, the toy can update the list of potential responsive programs that remain. When only one potentially responsive program applies to all of the triggering phrases, that responsive program may be activated, at such a time or place when it is appropriate and supplements the story being told.

In this regard, embodiments of the present invention encompass interchangeable literary works. That is, certain triggering phrases in a first literary work could elicit a particular response, depending on the arrangement of the triggering phrases (and non-triggering phrases) in the first literary work. In contrast, a different arrangement of these and other triggering phrases (and non-triggering phrases) could elicit a different series or sequence of responsive programs. Thus, the toys of the present invention can be programmed once and used with a number literary works.

Figure 5A:
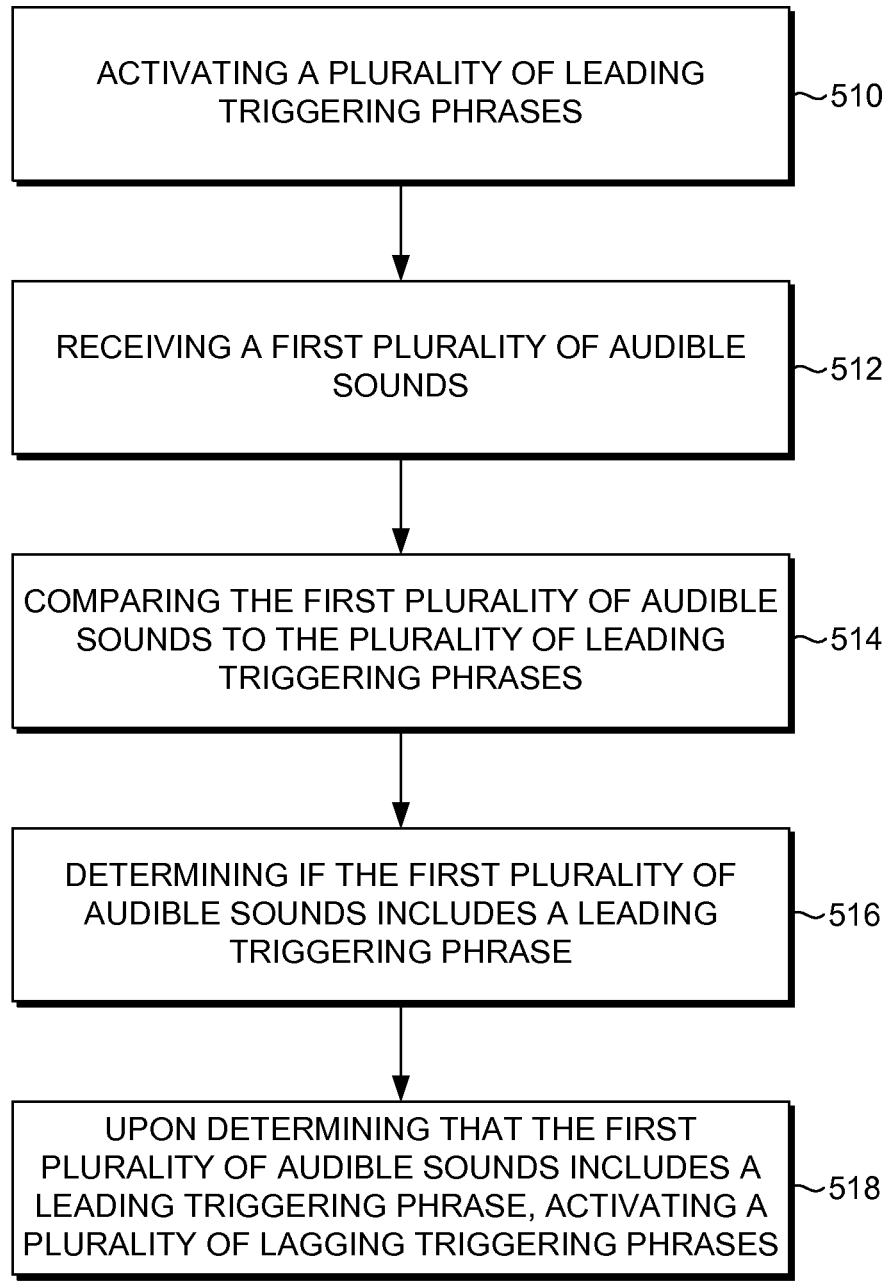
FIG. 5A is an excerpted flow diagram illustrating an exemplary method of activating triggering phrases from a memory to facilitate user interaction.

Some of the processes described above with regard to FIGS. 4A, 4B, and 4C will now be discussed in greater detail with regard to FIG. 5A. In FIG. 5A, a method of interacting with a user according to one embodiment of the present invention is illustrated. In this embodiment, at step 510, a computer program or application activates or calls a number of "leading triggering phrases." A leading triggering phrase is a triggering phrase that precedes another triggering phrase (e.g., a "lagging triggering phrase") that, when combined with the other triggering phrase, combines to define a unique program or response. The leading triggering phrase may have significance on its own, such as, for example, corresponding to a particular responsive program (e.g., an audio file played when the leading triggering phrase is received and detected). Alternatively, the leading triggering phrase may have no significance independent of one or more additional triggering phrases. In the latter embodiment, it is the combination of the leading triggering phrase with the lagging triggering phrase that defines the appropriate response. The leading triggering phrase can combine with any number of lagging triggering phrases, wherein any such combination can define a responsive program unique to that leading triggering phrase and lagging triggering phrase combination. Likewise, a leading triggering phrase may need to be combined with any number of lagging triggering phrases to acquire significance, for example, to define a responsive program. Thus, one leading triggering phrase could, for example, combine with two lagging triggering phrases to define a responsive program wherein a toy dog closes its eyes and pretends to go to sleep.

Figure 5B:
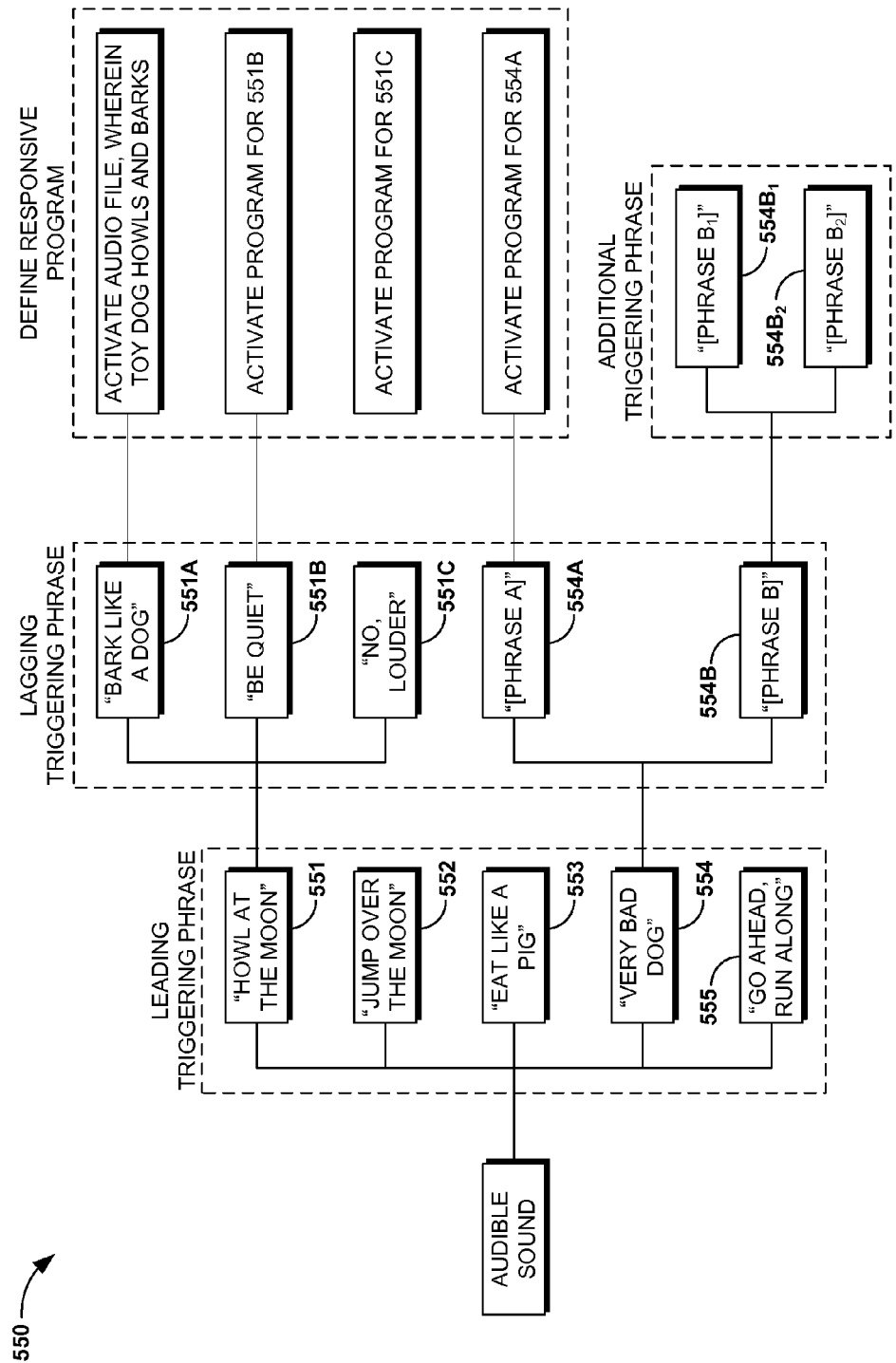
FIG. 5B is an excerpted diagram of embodiments of the present invention illustrating the relational programming of leading triggering phrases and lagging triggering phrases.

This feature of an embodiment of the present invention is generally illustrated in FIG. 5B. As shown in FIG. 5B, embodiments of the present invention include programming a number of leading triggering phrases 550 into a device, such as an interactive plush toy (for clarity, only a few potential options are illustrated in FIG. 5B). For example, leading triggering phrase 551 is "Howl at the moon." Leading triggering phrase 551 can have independent significance (e.g., activates a responsive program, such as, a dog howling at the moon) or may acquire significance only when a lagging triggering phrase, such as lagging phrases 551A, 551B, and 551C are received. Indeed, if, after leading triggering phrase 551 is received and detected, lagging triggering phrase 551A ("Bark like a dog") is detected, a different responsive program may be activated. In the example provided in FIG. 5B, this includes activating an audio file that includes a dog howling and barking at the moon. Other leading and lagging phrase combinations, such as 554 and 554B, may not define a responsive program and require further triggering phrases, as illustrated.

Returning now to FIG. 5A, at step 512, audible sounds are received. These sounds can be received from any source, such as, for example, a user reading a book or from the voice of a character in a movie being played. Thereafter, at step 514, a comparison is made comparing the first set of audible sounds to the activated or called leading triggering phrases. At step 516, a determination is made to determine whether the set plurality of audible sounds included one or more of the activated or called leading triggering phrase. This process has been described above, but generally applies laws of speech and speech recognition algorithms to differentiate and detect a pre-programmed triggering phrase. At step 518, a determination is made that the set of audible sounds did include at least one leading triggering phrase. Upon making this determination, a number of lagging triggering phrases are activated or called, and the process may repeat. That is, when a lagging phrase is received and detected, it may, along with the previously received and detect leading triggering phrase, define an interactive response. For example, in FIG. 5B, leading triggering phrase 551 combines with lagging triggering phrase 551B to define a unique responsive program (e.g., an audio file that supplements or augments the story from both triggering phrases).

In another embodiment of the present invention, the interactive toy is programmed to operate in, and switch among, a plurality of predetermined states. An exemplary state, in accordance with embodiments of the present invention, includes a phrase-detection state, in which the interactive toy is programmed to only analyze and detect certain triggering or non-triggering phrases. In other words, in a phrase-detection phase, the interactive toy is programmed to detect phrases as opposed to isolated commands such as single words, terms, or prompts that elicit a programmed interactive response. In another exemplary embodiment, the interactive toy is configured to operate in a term-detection state, in which the interactive toy is programmed to only analyze and detect certain triggering or non-triggering terms. Restated, the interactive toy in the term-detection state does not analyze received audible sounds to detect phrases (triggering and/or non-triggering). In still another embodiment of the present invention, the interactive toy is configured to switch between the phrase-detection state and the term-detection state based on detected prompts, e.g., detected phrases in the phrase-detection state or detected terms in the term-detection state. Thus, according to various embodiments of the present invention, the interactive toy might analyze, detect, and respond to certain types of triggering prompts in a first state, while also being configured to detect, analyze, and respond to a different type of prompts in a second state.

Dual- or multiple-state devices are advantageous because, among other things, they provide for greater context-specific interactivity with the user. For example, in the dual-state embodiments of the present invention, interactivity is enhanced because certain triggering prompts can be more specifically associated with the narrative being told in the literary work. For instance, a literary work could be written to include the following triggering terms "green," "yellow," and "red." These terms, however, are fairly common in many children's books and, thus, could result in a large number of false-positives if each triggering term was uniquely associated with an interactive response. Thus, if these terms always activated a predefined interactive responses (e.g., an audio playback of a recording saying "Green means go" for "green") every time the term was detected by the toy, the triggering terms will have little interactivity with the user (aside from the isolated cases where the triggered response is relevant to the story told in the book). Moreover, by defining these common colors as triggering terms, the story told in the book is somewhat limited by the desire to not have seemingly random responses. For instance, defining "green" to activate "Green means go" means that including a statement in the book that the "grass is green" is likely to cause the interactive toy to recite "green means go" in an inappropriate context. If, however, the triggering term "green" was only detected in a term-detection state, and a term detection state was only activated after detecting a predefined phrase (or phrases), embodiments of the present invention are able to avoid this and other problems in the art.

Figure 6A:
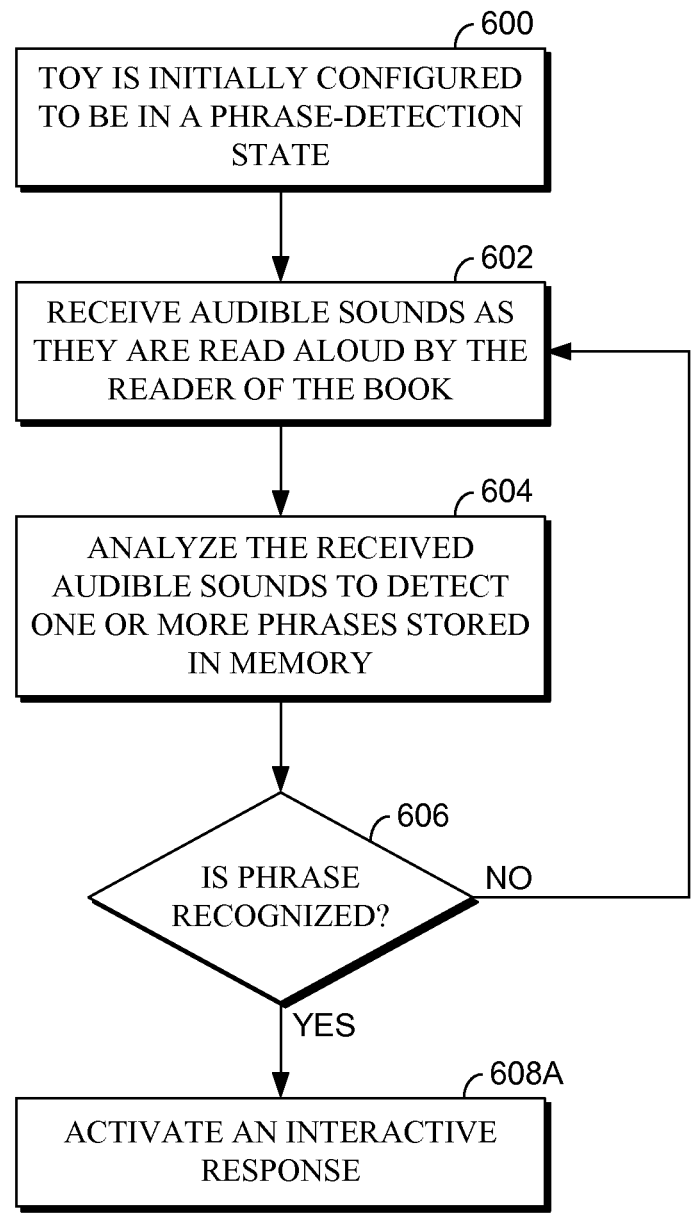
FIGS. 6A-6D are excerpted flow diagrams illustrating exemplary methods of activating an interactive response or alternate state based on detected prompts in a first state.

One example of these embodiments is illustrated in FIG. 6A. As generally discussed above (see, for example, FIG. 4A), embodiments of the present invention are operable to interact with a user reading a book. As previously explained with regard to FIG. 1, the book (or any literary work) may include a number of phrases that trigger responses by the interactive toy. These triggering phrases may be placed among, for example, a plurality of non-triggering phrases. The book may also include a number of triggering terms, as thoroughly explained above. Unlike a triggering phrase, a triggering term generally consists of a single word or command (as opposed to string of words or commands that combine to define a triggering or non-triggering phrase in memory). In some embodiments, the triggering term may be a long, multi-syllable word or may even be two words. Multi-syllable or longer triggering terms can be more easily detected and can render fewer false triggers. As discussed above, when a user reads the book aloud, he or she also reads aloud all of the triggering prompts included within the literary work, e.g., the triggering phrases and/or triggering terms.

In the embodiments demonstrated in FIGS. 6A-6D, the interactive toy is initially configured to be in a phrase-detection state (as shown by step 600). This initial configuration may, for example, be the initial configuration upon power up by the user or, instead, may be the initial configuration based on any other condition or criteria (e.g., information from the literary work, etc.). As explained above, in the phrase-detection state, the toy is configured to only detect and recognize phrases that have been read aloud from the book. In particular, in the phrase-detection state, the interactive toy is configured to receive audible sounds as they are read aloud by the reader of the book (step 602). This process, of course, is not limited to text read aloud from a book and, instead, more broadly encompasses any received audible sounds affiliated with a literary work designed for use with the interactive toy (e.g., movie, music, etc.). As shown by step 604, the interactive toy (which is still in the phrase-detection state) is further configured to analyze the received audible sounds to detect one or more phrases stored in memory. Because the interactive toy in this detailed example is in the phrase-detection state, it will not analyze, detect, or recognize any isolated terms or commands. Thus, in a phrase-detection state, after a phrase is detected, it is recognized by the interactive toy, as shown in step 606.

Figure 6B:
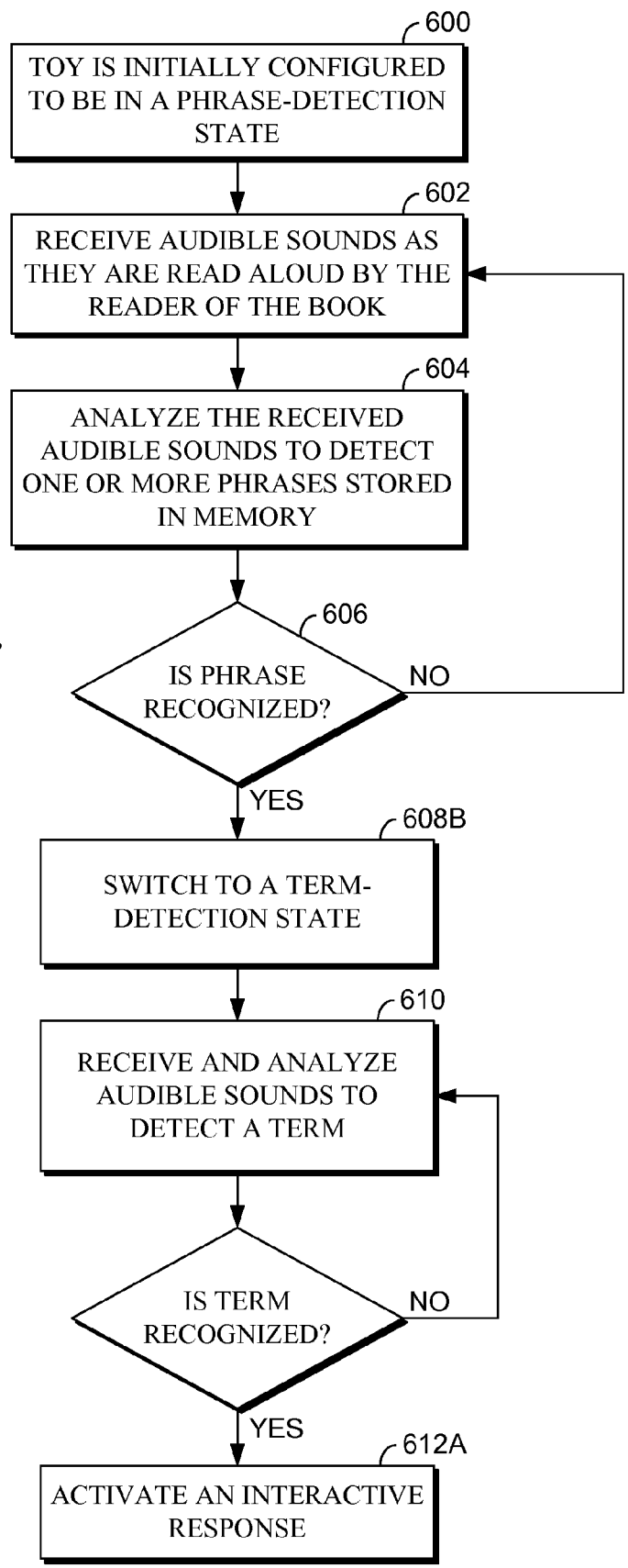
Figure 6C:
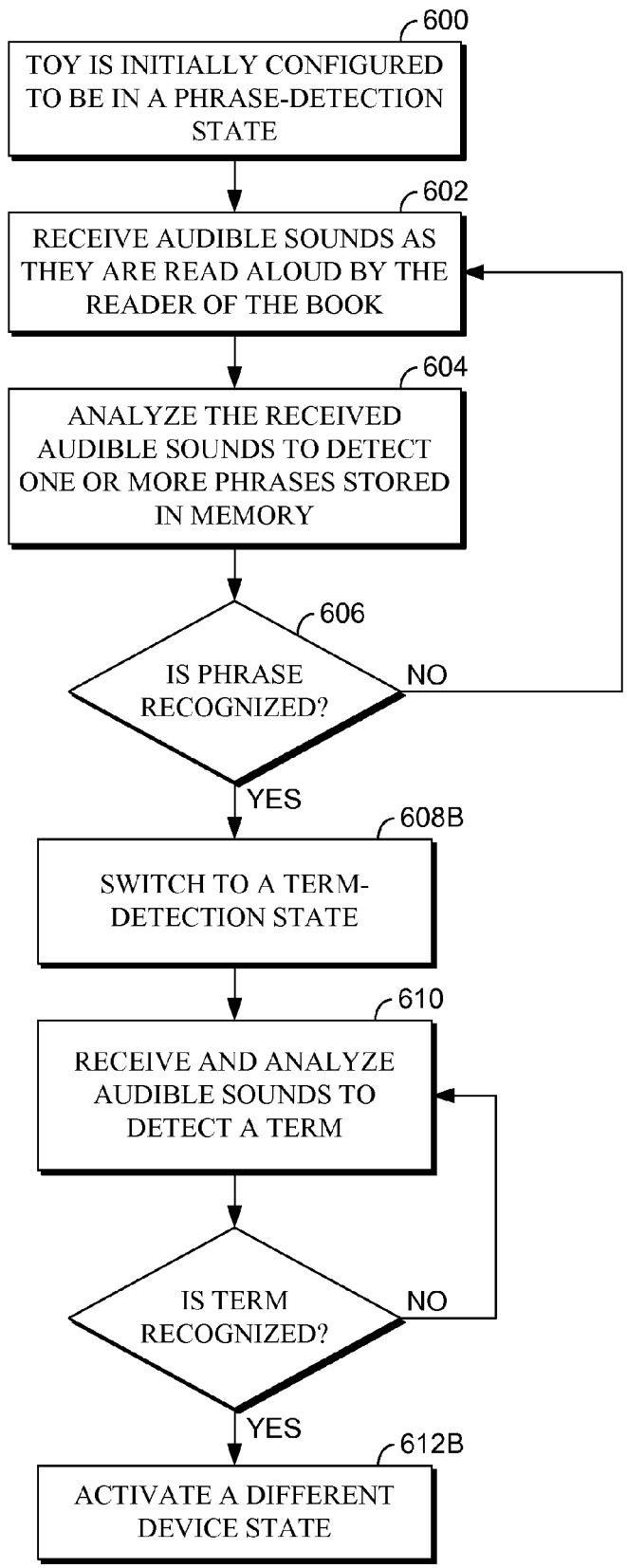

Depending on how the interactive toy is configured, this recognition may be as simple as activating an interactive response, as demonstrated by step 608A (FIG. 6A). It may also, for example, include switching from a phrase-detection state to a different state such as a term-detection state, as shown in step 608B (FIG. 6B). Unlike the phrase-detection state, in the term-detection state the interactive toy no longer recognizes detected triggering or non-triggering phrases. Instead, in the term-detection state, the interactive toy is configured to receive and analyze sounds to detect a triggering term or command, as demonstrated by step 610. The sounds, and in turn the triggering term, can be audible, such as a spoken word or words or other human created noise or a mechanical sound either live or in the playback of an audio file, such as a "ping" sound once familiar with turning the page in a read along book. The sounds can also be inaudible. In one embodiment, the inaudible sound is an ultrasonic sound recorded in a recording that is being played (e.g., a movie, TV show, read along CD) or generated live by a device (e.g., during a machine reading of a digital version of a literary work). After detecting a triggering term, the interactive toy in the term-detection state is further configured to recognize the detected term by, for example, activating a response (see 612A in FIG. 6B) or again activating a different device state (see 612B in FIG. 6C).

In some embodiments, a timer function is employed after a state change. For instance, after detection of a phrase in a phrase-detection state (see step 606), the interactive toy is configured to switch into a term-detection state and may further be configured to activate a timer associated with the literary work, the detected phrase, or any other parameter. In one embodiment, the timer sets the maximum amount of time that the device will remain in the second state, which, in this specific example, is the term-detection state. If, upon expiration of the timer a predetermined triggering term has not been detected or recognized, the interactive toy may return to its previous state (here, the phrase-detection state). The return to its previous state may be proceeded by the playing of an audio file, as discussed below. The timer function allows the toy to return to its default or normal state should the user skip ahead in the book, fast forward during the movie, or the like. The length of the timer is not rigidly defined in any of the embodiments of the present invention and, instead, the amount of time before the timer-initiated state change can depend on a number of factors, such as, for example, the reading level of the book, the detected phrase or term, or the like.

Figure 6D:
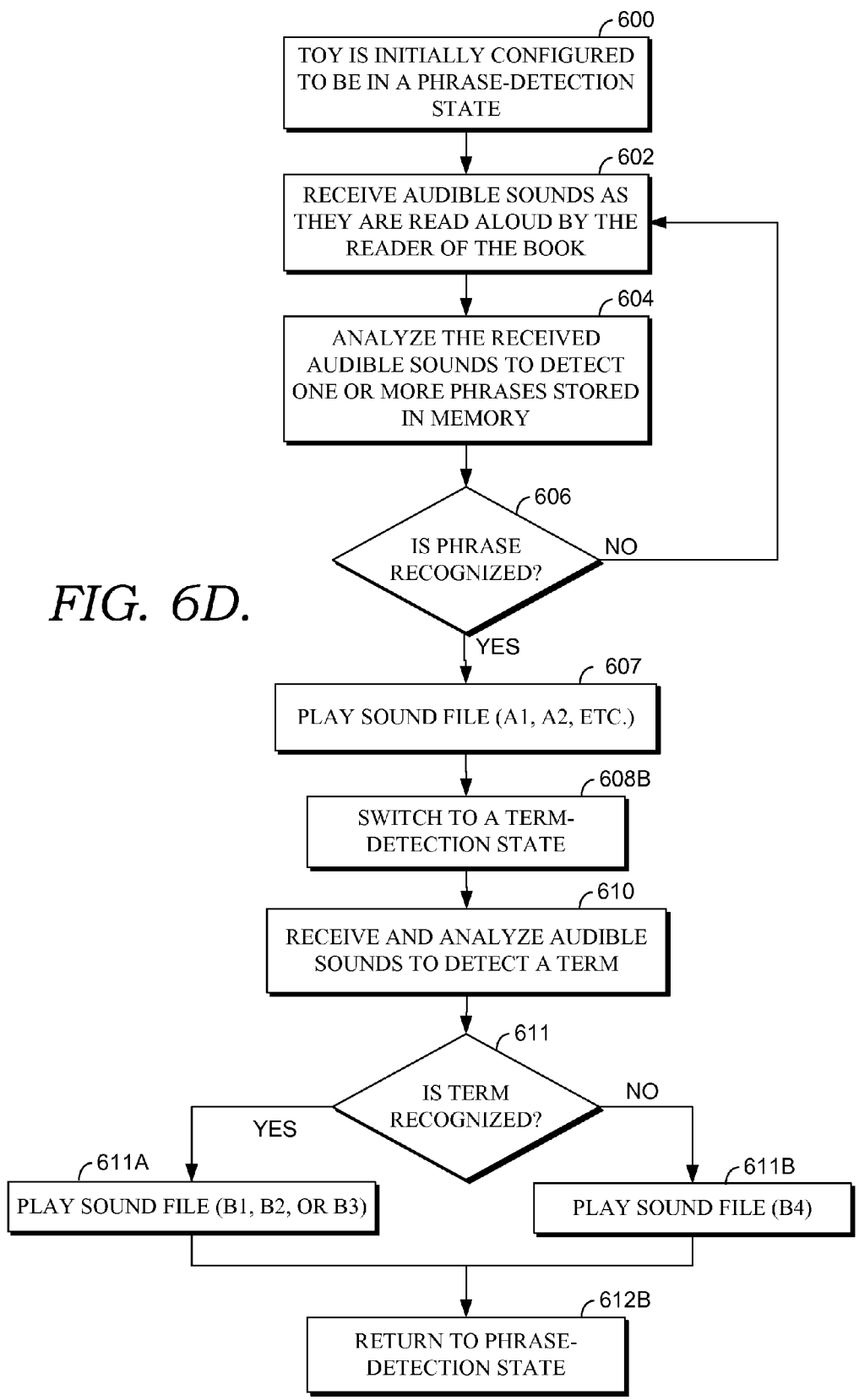

In one embodiment, depicted in FIG. 6D, the interactive toy allows a child to be a part of the story by seeking and responding to their input. Accordingly, in a book embodiment, where a parent is reading aloud a story from a book, the interactive toy is listening to the parent for a triggering phrase 602. Once a phrase is recognized at step 606, the interactive toy plays a stored sound file (e.g., A1) at step 607. The stored sound file is one that audibly seeks a response from the child. After the sound file is played 607, the interactive toy switches states 608B and listens for the desired response from the child at step 610. The listening step 610 occurs for a selected duration set by the timer. If a term is recognized during the allotted listening time, the interactive toy plays another sound file (e.g., B1, B2, or B3) that is responsive to the detected term at step 611A. For example, if the sound file A1 asks the child, "What farm animal do you see?", sound file B1 might be responsive to the term "cow", B2 might be responsive to the term "horse", and B3 might be responsive to the term "chicken". So, if the child responds, "Cow!" during the allotted time for the listening step 610 and the term "cow" is recognized at step 611, the interactive toy plays sound file B1 at step 611A. Sound file B1 might be something like, "Great eyes! I see the cow too, over by the barn.", thereby letting the child know that it heard and liked their pick.

If the interactive toy does not recognize a term at step 611 during the allotted listening time 610, or the listening time 610 expires, the interactive toy plays yet a different sound file (e.g., B4) that is generic at step 611B. For example, if the child does not respond at all, or the child responds with a term that is not one of the trigger terms (e.g., "lion" in our farm animal example above), the timer eventually causes the interactive toy to play sound file B4 at step 611B. Sound file B4 might be something like, "I like all kinds of farm animals.", a response that is not dependent on the term or absence of a term. Upon the playing of a sound file at step 611A or 611B, the interactive toy returns to the phrase detection mode at step 612B. Ideally, the book would then provide additional content for the parent to read that included another triggering phrase and the cycle could be repeated.

Embodiments of the present invention are, of course, not limited to phrase- and term-detection states. On the contrary, embodiments of the present invention encompass any configuration state that is consistent with the foregoing description and objectives for altering a device-state. For example, configuration states can include specific word-count states. That is, devices that are specifically configured to detect prompts based on the number of words in the prompt, e.g., a word-count state such as a single-word state (term-detection state), a two-word state (only recognizes two term phrases), a three-word state (only recognizes three term phrases), and so on (including combination-states of two or more of the foregoing such as a two- and four-word state). Other configuration states may include, for example only, states that detect terms or phrases based on language such as an English-detection state, a Spanish-detection state, a French-detection state, and so on (language-detection state). Another example could include gender-detection states, e.g., a female-detection state that recognizes triggering prompts spoken by a female (or a female-sounding, higher-pitched voice) and a male-detection state that recognizes triggering prompts spoken by a male (or male-sounding, lower-pitched voice). Similar embodiments can include configuration states based on the user's or users' age(s), including a state that detects prompts from a parent (parent-detection state) or child (child-detection state), or any other age-based state.

Figure 7A:
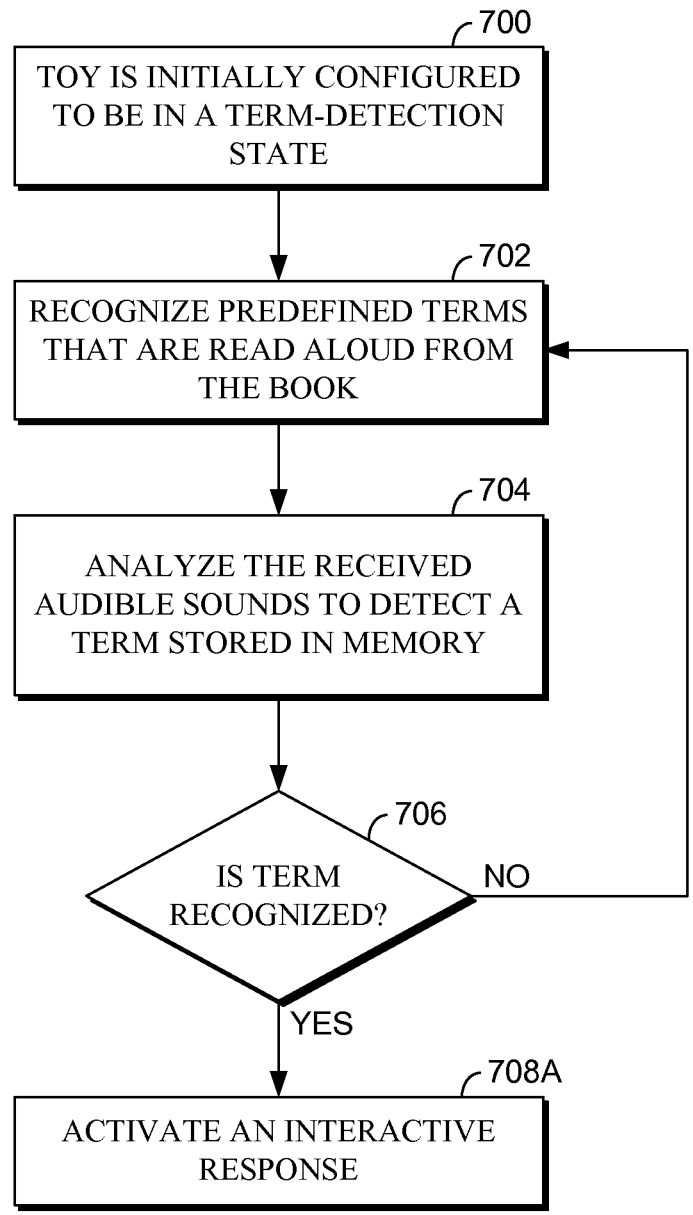
FIGS. 7A-7C are excerpted flow diagrams illustrating a second set of exemplary methods of activating an interactive response or alternate state based on detected prompts in a first state.
Figure 7B:
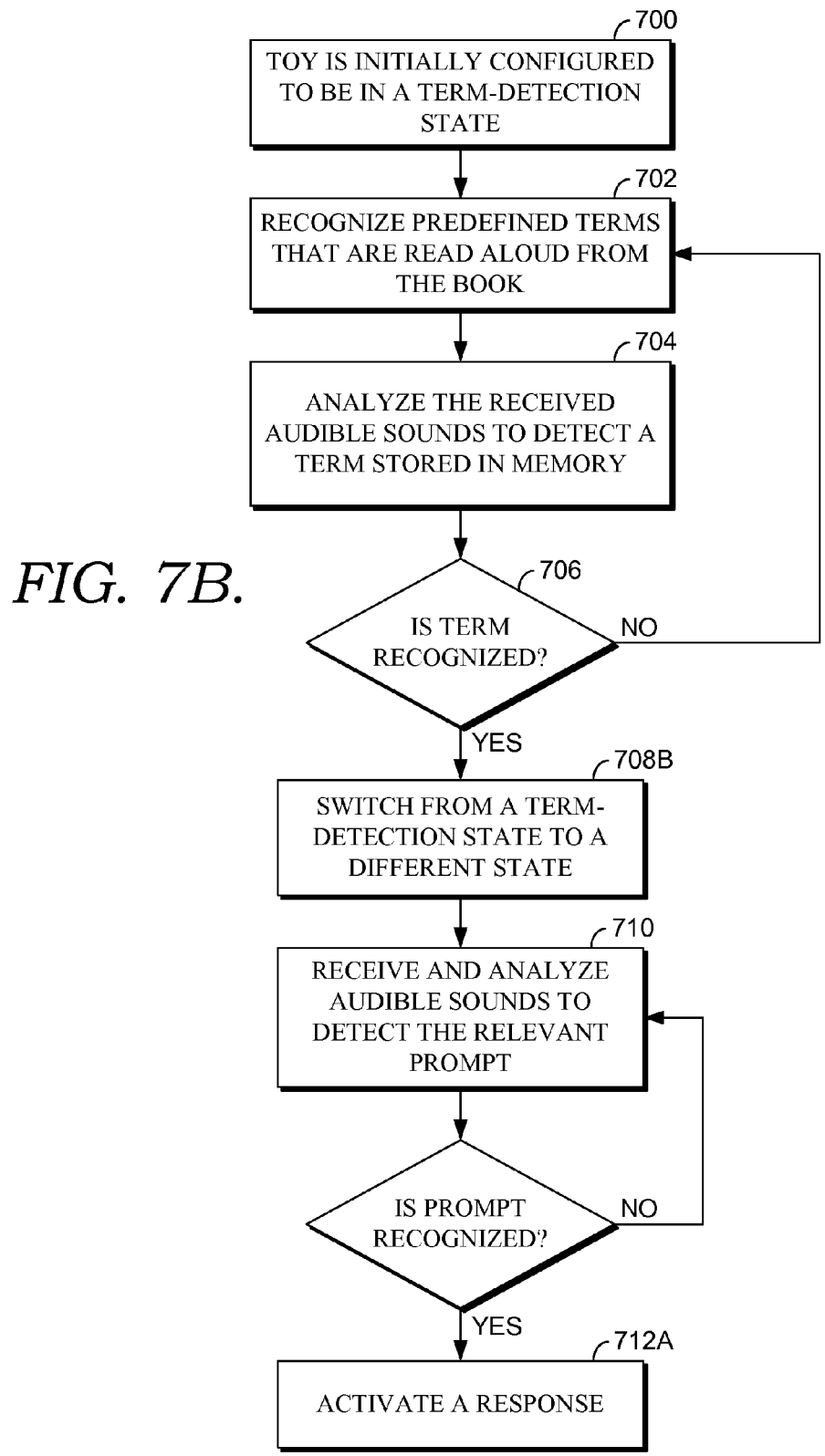
Figure 7C:
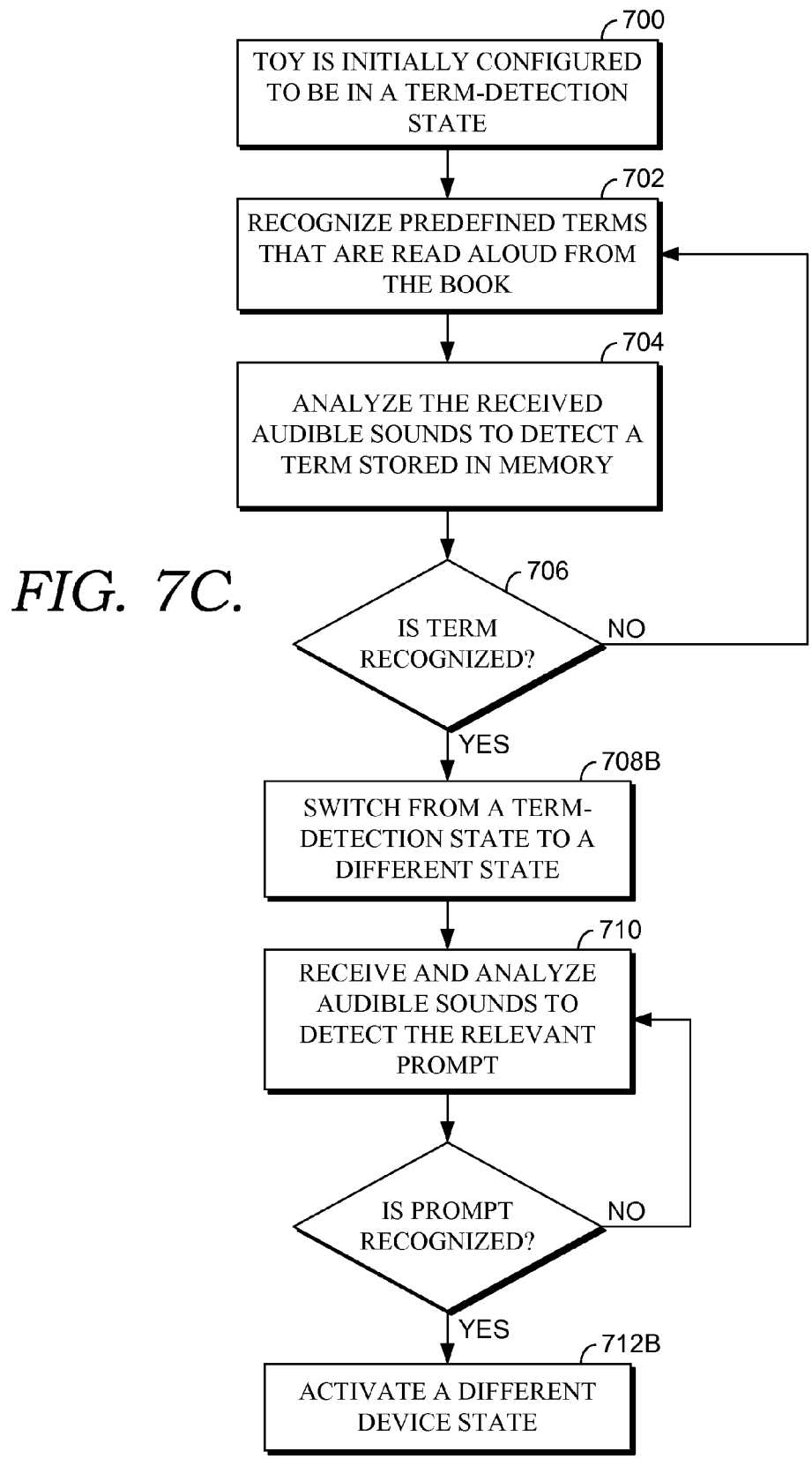

Turning now to the embodiment illustrated in FIGS. 7A-C, here the interactive toy is initially configured to be in a term-detection state (as shown by step 700). This initial configuration may, for example, be the initial configuration upon power up by the user or, instead, may be the initial configuration based on any other condition or criteria (e.g., information from the literary work, etc.). As explained above, in the term-detection state, the toy is configured to only detect and recognize predefined terms or commands that are read aloud from the book (step 702). As shown by step 704, the interactive toy in the term-detection state analyzes the received audible sounds to detect a triggering term stored in memory. Because the toy is in a term-detection state, it will not analyze, detect, or recognize phrases read aloud by the user, e.g., triggering or non-triggering phrases. Thus, in the term-detection state, the detected term is recognized by the interactive toy, as illustrated in step 706.

Depending on how the interactive toy is programmed, recognition of the term may simply require activating an interactive response (see step 708A of FIG. 7A). It may also include, for example, changing the configuration state of the interactive toy such that it is no longer in the term-detection state, e.g., changing to a phrase-detection state, switching to a specific word-count state, and so on. This is shown in step 708B (FIGS. 7B and 7C). In the new state, once a state-relevant condition is detected, the interactive toy is further configured to receive and analyze audible sounds to detect the relevant prompt, as demonstrated by step 710. If the relevant prompt is detecting in the new state, the interactive toy is further configured to recognize the prompt and respond accordingly (e.g., activate a response, as show in step 712A of FIG. 7B, activate a different state as shown in step 712B of FIG. 7C, and so on).

Figure 8:
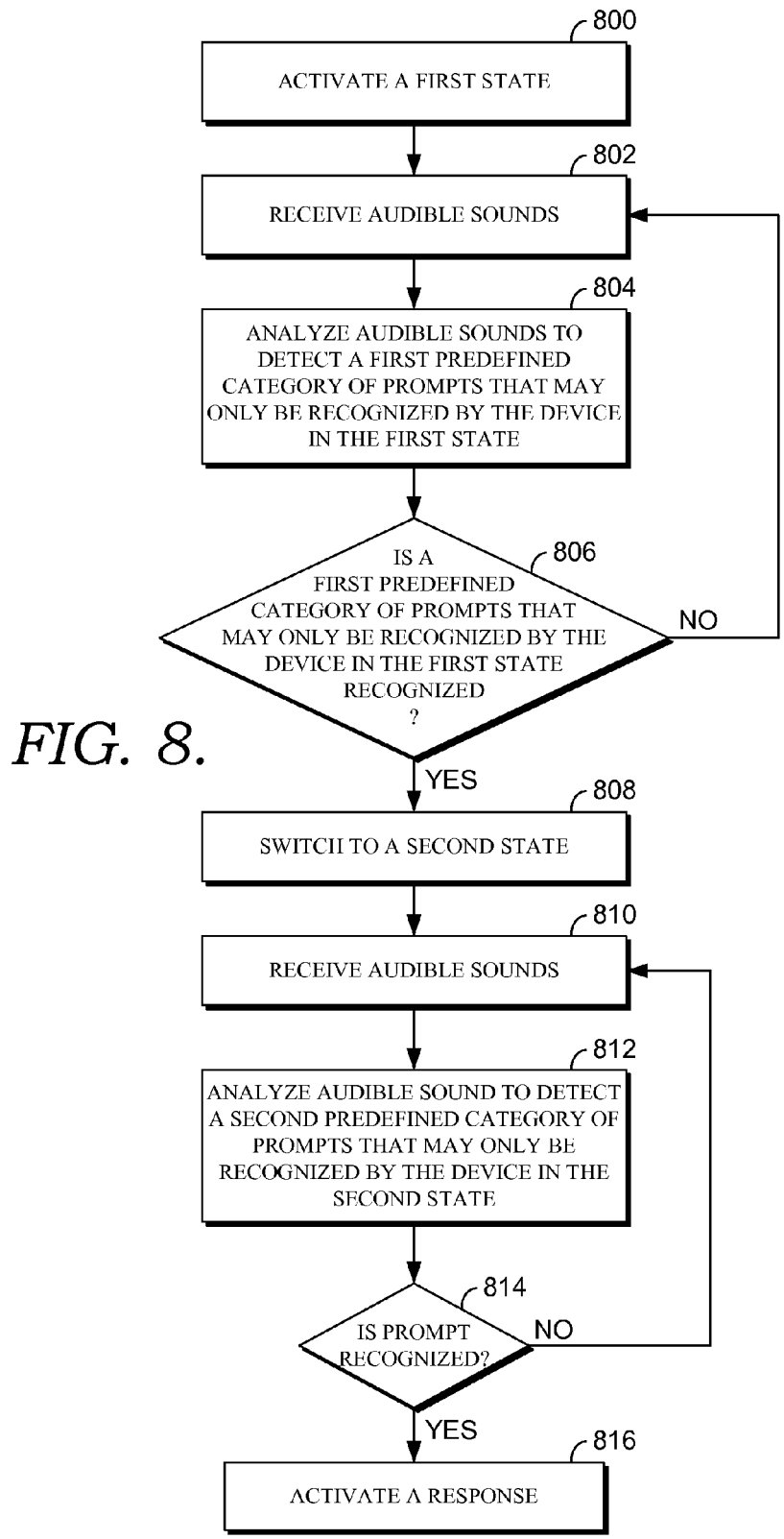
FIG. 8 is an excerpted flow diagram illustrating an exemplary embodiment of the present application concerning device-state modification based on recognized prompts.

Shown in FIG. 8 is a conceptual summary of embodiments of the present invention. First, a device programmed in accordance with the method described in FIG. 8 activates a first state (step 800). The first state has a first predefined category of prompts that may only be recognized by the device in the first state (steps 802 and 804). In other words, the same prompt that is recognized by the device in the first state may not be recognized by the device while the device is in a second state (that is different than the first state). Once a prompt within the first predefined category of prompts is detected or recognized by the device (step 806), the device is further configured to activate a second state and/or deactivate the first state (step 808). The second state has a second predefined category of prompts that may only be recognized by the device while the second state is active (steps 810 and 812). Thus, the same prompt that was detected and recognized by the device in the first state would not be recognized by the device while it was in the second state (e.g., prompts that are not associated with the first state). Of course, in some embodiments, some prompts may be associated with more than one predefined category of prompts and, as such, may be recognized by a device in more than one configurations state (e.g., "the stoplight was green" might be a defined prompt for a phrase-detection state and four-word state stored in the memory of the interactive toy). Thus, the device is simply programmed to detect and recognize prompts that are relevant to the active state of the device. Once a prompt within the second predefined category of prompts is detected or recognized by the device (step 814), the device is configured to activate a response (step 816). Other embodiments of the present invention are likewise configured to encompass any number of device-states, e.g., a first, second, third, fourth, and fifth state. The crux of the present embodiment is that some prompts are only recognized while a device is in a particular state and not recognized while the device is in another state.

By way of examples only, and not in a limiting sense, some possible illustrations of the embodiments of FIGS. 6-8 can be shown in a literary work in the form of an electronic audio book. While the following examples use an electronic audio book with processing and electronics therein, the same may be accomplished with a traditional paper book used in combination with a separate plush toy having electronics therein, as discussed above. The electronic audio book has either a display for electronically displaying pages of the book with text thereon or paper pages. The book also has a memory, where audio files, prompts, and programs are stored, a power supply, a microphone, and a speaker. In these embodiments, the book is a children's book with a story appropriate for a child. An adult begins reading the story to the child and the book is initially in the phrase detection state.

While the phrase recognition state discussed above has been found superior in performance to traditional command/control voice recognition devices (i.e., devices that have a list of words that cause the device to activate every time any of the words on the list are detected—a term detection state) in a number of respects (e.g., fewer false activations), the phrase detection state requires more processing power and has a more difficult time recognizing phrases spoken by children. In other words, there is a broader range of voices that can activate command/control states than phrase detection states. Consequently, when a term or phrase will be spoken by a child, it is often beneficial for the device to be in a term-detection or command/control state, to increase the likelihood the child's words are detected. However, when multiple words and phrases are going to be spoken by an adult and only a small number are supposed to cause a response, it is beneficial to use the more discerning phrase detection state. Accordingly, the present invention permits switching between the two methods for detecting speech to obtain the benefits of both methods.

Returning to the examples, the adult is reading the story to the child. This works well in stories suited for young children that likely would not be reading the story themselves. The phrase detection state is analyzing the words spoken by the adult. The words can contain triggering and non-triggering phrases. Upon detection of a triggering phrase (e.g., "leave on time"), which may be required to be detected after a non-triggering phrase (e.g., "will the train"), the book may activate an interactive response 608A (e.g., the audio book activates playback of an audio file of a train engine running) or may switch from the phrase detection state to a term detection state 608B. In combination with switching to the term detection state 608B, the book may play an audio file seeking to elicit a short, specific, audible response from the child in order to get them involved in the story. For example, after the book detects the adult has read the phrase "Will the train leave on time?", the book may switch to the term detection state and play an audio file of a question for the child to answer (e.g., "Can you say, 'All Aboard'?). The book, now in the term detection state, easily detects the child say the word "aboard" when they respond, "All aboard!" The book, upon detecting the child's response, activates an interactive response 612A (e.g., playing back an audio file that says, "Yeah, we are leaving on time!") and switches back to the phrase detection state 612B in preparation for the adult to continue reading more of the story. In this manner the child gets to interact with the book and be a part of the story, as the book responds to them. Also, as discussed above, if the child does not respond or responds with non-triggering terms, the timer causes the book to play a generic response to close that question and resume with the reading of the book in the phrase detection state. The book can then switch back and forth between the phrase recognition state and the term recognition state.

In another embodiment, the book's responses to the child's answer of the book's questions can be made dependent on the words spoken by the child. For example, the book may be activated in response to detection of a certain triggering phrase to play an audio file wherein the book asks the child, "What is your favorite color?". With the book in the term detection mode, it may be listening for any of three terms. When the child says, "Red" or "My favorite color is red", the book detects the term or command "red" and responds by activating an audio file that says, "I like the color red too." In this manner, the child feels the book is responding to them specifically. The child, next time through the book, may change their answer to test the book to see if it is really listening to them. The child may say, "Green" or "My favorite color is green." Again, if the term "green" is one of the commands in its list, it responds by activating an audio file that says, "I like the color green too." If the color is not in the list or the child doesn't answer in a predetermined amount of time, the book may respond by planning an audio file with a generic answer (e.g., "There are lots of great colors.").

To enhance the likelihood that the child responds with one of the selected terms in the list, the editorial and/or visuals in the book can be created to "suggest" or "lead" the child to make a certain response. For example, if the book plays a sound file after detecting an adult read triggering phrase that says, "Make a sound of a farm animal", the drawing for that page in the book may have only a cow, a pig, and a horse. The child, seeing that drawing, would be more likely to make the sound of one of the animals on the page. Those sounds can be the sounds on the list. If the child moos, the book may play a sound file that says, "That's right! I like it when cows moo." If the child cock-a-doodle-doos, the book may play a sound file with a generic response, such as, "I like all farm animal sounds." The book, after playing the responsive audio, switches back to the phrase detection mode, where it no longer recognizes the predefined category of prompts of the term detection state, so that repeated mooing by the child does not cause repeated playback of responses related to the moo sound.

The interactive toy need not be limited to the context of a book or a plush. For example, the interactive toy may be incorporated into a wearable device 900, such as a costume or a mask. In one embodiment, depicted in FIG. 9, the interactive toy is a wearable costume feature associated with a character (e.g., Batman's mask and cape). The wearable 900 may be accompanied with a book (not shown) about the character (e.g., a story about Batman). A child can be dressed in the character-related wearable while listening to an adult read the book. The wearable 900 includes the electronic components therein necessary to activate an interactive program in response to received audio in accordance with an embodiment of the present invention. Such components may include a processor, a memory, where audio files and programs are stored, a power supply, a microphone, and a speaker.

The wearable 900 may preferably operate in and switch between two modes, namely, a playtime mode and a storytime mode. Initially, when the wearable is powered up or turned on, at step 901, it is in the storytime mode and is configured to be in a phrase-detection state. The wearable or toy 900 is configured to receive audible sounds as they are read aloud by the reader of the book (step 902). The received audible sounds are analyzed to detect phrases that are stored in memory (step 904), similar to the process described above. However, in this embodiment, the toy 900 is also listening for a command stored in memory 904. The analyzing of the received audible sounds to detect phrases and to detect a command 904 can be done simultaneously or sequentially. If a phrase is recognized, at step 906A, the wearable 900 plays a sound file at step 907 and returns to the receiving audible sounds at step 902. For example, if the wearable 900 recognizes the phrase, "Let's go get the Joker, Robin!", the wearable can play an sound/audio file that says, "To the Batmobile!" in the voice of the Batman character. The wearable 900 then continues to listen for other phrases from the book at step 902 and plays other related sound files at step 907 when they are detected.

If a phrase is not recognized at step 906A, the received audible sounds are analyzed to detect a command. The command can be a single word or group of words that are used to switch the wearable 900 between the storytime mode and the playtime mode. If a command is not recognized at step 906B, the wearable 900 then continues to listen for phrases from the book or the command at step 902.

If the command is recognized at step 906B, the wearable switches to the playtime mode and, at step 908, to a term detection state. The playtime mode does not require the phrases from the book, but listens for various terms stored in memory at step 910. This allows the child to play with the wearable apart from with the book or in the confines of the book's storyline. The child, "untied" to the book, can run around and have their own playtime interaction with the toy 900. During the playtime, the wearable 900 receives and analyzes audible sounds to detect a term, at step 910. As discussed above in previous embodiments, the term can be a single word or group of words, stored in the memory of the toy 900. If a term is recognized, at step 912A, the wearable plays a sound file (at step 913) and then listens for more terms (at step 910). For example, the child might say the word "penguin", which is one of the terms stored in memory. When recognized at step 912A, the wearable 900, at step 913, plays an audio file that might be Batman saying, "I don't like that guy's sinister laugh."

If a term is not recognized at step 912A, the received audible sounds are analyzed to detect a command, at step 910. If a command is not recognized at step 912B, the wearable 900 then continues to listen for terms from the book or the command at step 910. If the command (e.g., "Justice" or "Justice League") is recognized at step 912B, the wearable switches back to a phrase-detection state, at step 914, and back to the storytime mode, where it begins receiving audible sounds, at step 902, and analyzing them for phrases and the command, at step 904. In this manner, the wearable can augment a story of a book (or audio or video) with an increased level (i.e., more accurate and fewer false triggers) of speech/voice recognition or can function independently thereof in a less structured environment where activation is more important and false activations are not as noticeable.

While the wearable embodiment discussed immediately above discloses the use of an audible command for switching the toy 900 between playtime and storytime modes, the switching between modes could be accomplished by other means, such as by a the sliding of a switch or the pressing of a button. Additionally, other steps may be added to the sequence. For example, after the command is recognized (or the switch or button is activated), the toy 900 could play an audio file to let the child know that it has switched modes. In one embodiment the means for switching modes could be a button that toggles between modes and powering on and off. For example, press the button once and the toy 900 powers on in storytime mode, press again and it switches to playtime mode, and press again an it powers off. Sample audio files that could be played are: when switched to storytime mode, "I'm ready to read with you"; when switched to playtime mode, "I'm ready to play with you"; and when powered off, "Goodbye."

It should be noted again that the audio that the interactive toy is detecting can be from any source. It can be created live or can be a playback of a recording. It can be audible or inaudible (e.g., ultrasonic). It can be human or machine created. Similarly, it can be from reading a literary work aloud or can be a "read along" recording, such as a CD or a digital audio file. It can be played on any device capable of producing audio (e.g., a computer, a phone, a TV, a digital music player, an e-reader, a tablet computer, a PDA, etc.). In one embodiment it is a DVD movie that has pings embedded in the movie and the interactive toy responds based off of pings played throughout the movie. In another embodiment, it is a digital version of a book that is "read aloud" by an e-reader's text to speech engine. In yet another embodiment, it is a digital storybook playing back a prerecorded sound file of someone (e.g., a relative) reading the text of the storybook. Other methods of producing audio are contemplated and within the scope of the present invention.

From the foregoing it will be seen that this invention is one well adapted to attain all ends and objects hereinabove set forth together with the other advantages which are obvious and which are inherent to the method and apparatus. It will be understood that various modifications can be made and still stay within the scope of the invention. For example, instead of being an interactive plush toy dog, the interactive plush toy could be a cat, a reindeer, a goat, or any other animal or even a person/character. Instead of being plush, the interactive toy could be constructed of any material. It will also be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An interactive toy that performs a method for interacting with a user, the method comprising:
    activating a phrase-detection state in which said toy is configured to receive a first plurality of audible sounds corresponding to text read aloud from a book;
    receiving, through a microphone embedded in the toy, the first plurality of audible sounds;
    processing a signal associated with the first plurality of audible sounds to detect one or more triggering phrases, wherein the one or more triggering phrases are a combination of words corresponding to text from the book;
    detecting a triggering phrase was read aloud by the user reading the book;
    upon detecting the triggering phrase, switching to a term-detection state in which said toy is configured to receive a second plurality of audible sounds;
    receiving, through the microphone, the second plurality of audible sounds;
    processing a signal associated with the second plurality of audible sounds to detect one or more single triggering terms, wherein the one or more single triggering terms are predetermined words or commands;
    detecting the one or more single triggering terms spoken by the user; and
    upon detecting the triggering term, activating a response sequence that supplements a story told in the book, wherein the response sequence is determined from a pre-programmed response program.

2. The method of claim 1, wherein triggering phrases include a plurality of non-triggering terms.

3. The method of claim 1, wherein triggering phrases include one or more terms that would be triggering terms in the term-detection state, but wherein analyzing the one or more terms that would be triggering terms in the term-detection state does not cause activation of the response sequence.

4. The method of claim 1, wherein the response sequence is only activated when the triggering term is detected within a predetermined amount of time after activating the term-detection state.

5. The method of claim 1, the method further comprising:
when the triggering term is not detected within a predetermined amount of time after activating the term-detection state, switching from the term-detection state back to the phrase-detection state.

6. The method of claim 1, wherein the interactive toy is a wearable device having electronic components therein for activating an interactive program to perform the method in response to received audio, the components including a processor, a memory with audio files and programs stored therein, a power supply, and a speaker.

7. The method of claim 6, wherein activation of the response sequence that supplements a story told in the book includes the device playing an audio file of responsive content when a triggering term is detected.

8. The method of claim 6, wherein the device plays an audio file responsive to activation of the term-detection state to acknowledge the desired change in state and to inform the wearer of the new state in which the device is operating.

9. An interactive toy that performs a method for interacting with a user, the method comprising:
activating a first state in which said toy is configured to receive a first plurality of audible sounds corresponding to text read aloud from a book containing a triggering phrase, wherein the triggering phrase is a combination of words corresponding to text from the book;
receiving, through a microphone embedded in the toy, the first plurality of audible sounds;
processing a signal associated with the first plurality of audible sounds to detect the triggering phrase;
detecting that the triggering phrase was read aloud by the user reading the book;
upon detecting that the triggering phrase was read aloud by the user reading the book, switching to a second state in which the toy is configured to receive a second plurality of audible sounds;
receiving, through the microphone, the second plurality of audible sounds;
processing a signal associated with the second plurality of audible sounds to detect one or more single triggering terms, wherein the one or more single triggering terms are predetermined words or commands related to the book;
detecting that the one or more single triggering terms spoken by the user reading the book; and
upon detecting that the triggering term was spoken by the user reading the book, activating a response sequence that supplements a story told in the book, wherein the response to the triggering term is only activated when the toy is in the second state and the triggering term is detected within a predetermined amount of time after detecting the triggering phrase and wherein the response sequence is determined from a pre-programmed response program.

10. The method of claim 9, wherein triggering phrase includes one or more terms that would be a triggering term in the second state.

11. The method of claim 9, the method further comprising:
if the triggering phrase is not detected within a predetermined amount of time after activating the second state, switching from the phase-detection state to the first state.

12. The method of claim 9, wherein the interactive toy is a wearable device having electronic components therein for activating an interactive program to perform the method in response to received audio, the components including a processor, a memory with audio files and programs stored therein, a power supply, and a speaker.

13. The method of claim 12, wherein activation of the response sequence that supplements a story told in the book includes the device playing an audio file of responsive content when a triggering term is detected.

14. The method of claim 12, wherein the device plays an audio file responsive to activation of the second state to acknowledge the desired change in state and to inform the wearer of the new state in which the device is operating.

* * * * *